(12) United States Patent
Toyama et al.

(10) Patent No.: US 7,012,721 B2
(45) Date of Patent: Mar. 14, 2006

(54) OPTICAL IMAGING SYSTEM WITH ROD LENS ARRAY

(75) Inventors: Minoru Toyama, Osaka (JP); Shigeo Kittaka, Osaka (JP)

(73) Assignee: Nippon Sheet Glass Company Limited, Tokyo (JP)

( * ) Notice: Subject to any disclaimer, the term of this patent is extended or adjusted under 35 U.S.C. 154(b) by 660 days.

(21) Appl. No.: 10/068,166

(22) Filed: Feb. 6, 2002

(65) Prior Publication Data
US 2002/0145705 A1 Oct. 10, 2002

(30) Foreign Application Priority Data
Feb. 7, 2001 (JP) .............................. 2001-030651

(51) Int. Cl.
*G02B 3/00* (2006.01)
(52) U.S. Cl. .................. 358/474; 358/34; 358/501; 358/401; 358/505; 359/652; 359/654
(58) Field of Classification Search ............ 358/1.1, 358/1.2, 1.3, 1.4, 1.5, 1.6, 1.7, 1.8, 1.9, 1.11, 358/1.12, 1.13, 1.14, 1.15, 1.16, 1.17, 1.18, 358/501, 505, 401, 474; 359/642, 654, 618, 359/652; 250/208.1, 227.2; 385/34
See application file for complete search history.

(56) References Cited

FOREIGN PATENT DOCUMENTS

| EP | 0 898 181 | 2/1999 |
|---|---|---|
| EP | 0 926 513 | 6/1999 |
| EP | 1 003 059 | 5/2000 |
| EP | 1 111 902 | 6/2001 |

OTHER PUBLICATIONS

European Search Report.

*Primary Examiner*—King Y. Poon
(74) *Attorney, Agent, or Firm*—Hamre, Schumann Mueller & Larson, P.C.

(57) ABSTRACT

An optical imaging system is provided that includes a rod lens array and has the optimum refractive index distribution for achieving a high resolving power. The refractive index distribution of rod lenses can be expressed by $$n(r)^2 = n_0^2 \cdot \{1-(g \cdot r)^2 + h_4 \cdot (g \cdot r)^4 + h_6 19 (g \cdot r)^6 + h_8 \cdot (g \cdot r)^8\} \quad \text{Eq. 45}$$

where r is a radial distance from the optical axis of the rod lenses, $n_0$ is a refractive index on the optical axis of the rod lenses, and g, $h_4$, $h_6$ and $h_8$ are refractive index distribution coefficients. The refractive index distribution coefficients $h_4$, $h_6$ and $h_8$ are set on a spheroid in a Cartesian coordinate system with $h_4$ being x-axis, $h_6$ being y-axis and $h_8$ being z-axis. The spheroid is defined by a vector X* that is expressed by $$X^* = (x, y, z) = O^* + k_A A^* + k_B B^* + k_C C^* \quad \text{Eq. 46}$$

where O* is a vector from the origin of the Cartesian coordinate system to the center of the spheroid, A*, B* and C* are vectors in the directions of the major axis, the mean axis and the minor axis of the spheroid, respectively, and $k_A$, $k_B$ and $k_C$ satisfy $k_A^2 + k_B^2 + k_C^2 \leq 1$.

11 Claims, 22 Drawing Sheets

OPTICAL IMAGING SYSTEM WITH ROD LENS ARRAY

BACKGROUND OF THE INVENTION

1. Field of the Invention

The present invention relates to an optical imaging system used in an image transmission portion of, e.g., a facsimile device or a copier. More particularly, the present invention relates to an optical imaging system including a plurality of rod lenses arranged in an array.

2. Description of the Related Art

Optical imaging systems including a plurality of rod lenses with a refractive index distribution in the radial direction that are arranged in an array are widely used in the image transmission portion of, e.g., facsimile devices or copiers.

The refractive index distribution of such rod lenses can be expressed, e.g., by $$n(r)^2 = n_0^2 \cdot \{1-(g \cdot r)^2 + h_4 \cdot (g \cdot r)^4 + h_6 \cdot (g \cdot r)^6 + h_8 \cdot (g \cdot r)^8\} \quad \text{Eq. 6}$$

where r is a radial distance from the optical axis of the rod lens, $n(r)$ is a refractive index at the radial distance r, $n_0$ is a refractive index on the optical axis of the rod lens (i.e., the center refractive index), and g, $h_4$, $h_6$ and $h_8$ are refractive index distribution coefficients.

Conventionally, the resolving power demanded from such a rod lens array called for an MTF (modulation transfer function) of at least 60% when a pattern of 4–6 line-pairs/mm (ca. 200 dpi–300 dpi) was imaged. To meet this demand, it was sufficient to control only g or both g and $h_4$ of the refractive index distribution coefficients for the rod lenses.

Recently, however, with the steadily rising quality of printers and scanners, there is a demand for rod lens arrays with a resolving power of at least 12 line-pairs/mm (ca. 600 dpi). To achieve a rod lens array having such a high resolving power, all the refractive index distribution coefficients, including $h_6$ and $h_8$, have to be controlled precisely during design and fabrication of the rod lens array.

It is possible to determine the optimum refractive index distribution coefficients for correcting the spherical aberration on the optical axis of a single rod lens. However, in the case of a plurality of rod lenses arranged in an array, a change in the resolving power may be caused not only by the spherical aberration, field curvature and astigmatism of the individual lenses but also by the overlapping of images from neighboring lenses.

The optimum refractive index distribution also changes depending on the brightness of the rod lenses. For example, when bright rod lenses having a large angular aperture are employed, the refractive index distribution coefficients for a small axial spherical aberration are very different from the refractive index distribution coefficients for a small field curvature. The best resolving power can be achieved by striking a balance between the two.

An overlapping degree m is given by $$m = X_0 / 2r_0 \quad \text{Eq. 7}$$

where $r_0$ is the radius of an effective lens portion, i.e., the radius of the portion of each rod lens that functions as a lens, and $X_0$ is the image radius that a single rod lens projects onto an image plane (i.e., the field of view). Here, $X_0$ is defined as $X_0 = -r_0/\cos(Z_0 \pi/P)$, where $Z_0$ is the length of a rod lens and P is a one-pitch length of the rod lens. Even if the rod lenses have the same refractive index distribution, the overlapping degree m changes with the lens length, and thus causing a change in the resolving power.

Consequently, to achieve a high resolving power, the refractive index distribution coefficients have to be determined separately in accordance with at least the brightness and the overlapping degree of each rod lens.

SUMMARY OF THE INVENTION

Therefore, with the foregoing in mind, it is an object of the present invention to provide an optical imaging system including a plurality of rod lenses arranged in an array and having a refractive index distribution that is ideal for achieving a high resolving power.

An optical imaging system according to a configuration of the present invention includes a rod lens array including a plurality of rod lenses having a refractive index distribution in the radial direction that are arranged in two rows with their optical axes in parallel, and a manuscript plane and an image plane that are located on the opposite sides of the rod lens array. The refractive index distribution of the rod lenses is expressed by $$n(r)^2 = n_0^2 \cdot \{1-(g \cdot r)^2 + h_4 \cdot (g \cdot r)^4 + h_6 \cdot (g \cdot r)^6 + h_8 \cdot (g \cdot r)^8\} \quad \text{Eq. 8}$$

where r is a radial distance from the optical axis of the rod lenses, $n_0$ is a refractive index on the optical axis of the rod lenses, and g, $h_4$, $h_6$ and $h_8$ are refractive index distribution coefficients. The refractive index distribution coefficients $h_4$, $h_6$ and $h_8$ are on a spheroid in a Cartesian coordinate system with $h_4$ being x-axis, $h_6$ being y-axis and $h_8$ being z-axis. The spheroid is defined by a vector $X^*$ that is expressed by $$X^* = (x, y, z) = O^* + k_A A^* + k_B B^* + k_C C^* \quad \text{Eq. 9}$$

where $O^*$ is a vector from the origin of the Cartesian coordinate system to the center of the spheroid, $A^*$, $B^*$ and $C^*$ are vectors in the directions of the major axis, the mean axis and the minor axis of the spheroid, respectively, and $k_A$, $k_B$ and $k_C$ satisfy $k_A^2 + k_B^2 + k_C^2 \leq 1$.

According to this configuration, an optical imaging system can be provided that includes a plurality of rod lenses arranged in an array and has the optimum refractive index distribution for attaining a high resolving power of at least 12 line-pairs/mm (ca. 600 dpi) when the outer diameter of the lenses is 0.6 mm.

In the optical imaging system according to the configuration of the present invention, it is preferable that $k_A$, $k_B$ and $k_C$ satisfy $$k_A^2 + k_B^2 + k_C^2 \leq 0.7. \quad \text{Eq. 10}$$

This preferred example can provide an optical imaging system having a more favorable refractive index distribution.

In the optical imaging system according to the configuration of the present invention, it is preferable that the refractive index $n_0$ on the optical axis of the rod lenses is in the range of $1.4 \leq n_0 \leq 1.8$.

In the optical imaging system according to the configuration of the present invention, it is preferable that the product $g \cdot r_0$ of the refractive index distribution coefficient g and a radius $r_0$ of the portion of each rod lens functioning as a lens is in the range of $0.04 \leq g \cdot r_0 \leq 0.27$. When $g \cdot r_0$ is smaller than 0.04, the image may become too dark and the time for scanning etc. is long. When $g \cdot r_0$ is larger than 0.27, the influence of field curvature and astigmatism may become too large and the resolving power is reduced.

In the optical imaging system according to the configuration of the present invention, it is preferable that the refractive index distribution of the rod lenses is expressed by $$n(r)^2 = n_0^2 \cdot \{1-(g \cdot r)^2 + f(r)\}$$  Eq. 11 where f(r) is a function of r, and that the f(r) satisfies $$h_{4A} \cdot (g \cdot r)^4 + h_{6A} \cdot (g \cdot r)^6 + h_{8A} \cdot (g \cdot r)^8 \leq f(r) \leq h_{4B} \cdot (g \cdot r)^4 + h_{6B} \cdot (g \cdot r)^6 + h_{8B} \cdot (g \cdot r)^8$$  Eq. 12 for r in the range of $0 \leq r \leq r_0$ ($r_0$: a radius of the portion of each rod lens functioning as a lens) with respect to two groups of refractive index distribution coefficients ($n_0$, g, $h_{4A}$, $h_{6A}$, $h_{8A}$) and ($n_0$, g, $h_{4B}$, $h_{6B}$, $h_{8B}$) that are in the ranges determined by Equation 9.

In the optical imaging system according to the configuration of the present invention, it is preferable that the radius $r_0$ of the portion of each rod lens functioning as a lens is in the range of $0.05$ mm $\leq r_0 \leq 0.60$ mm. This preferred example can facilitate production and assembly of the rod lenses and suppress the aberrations of the rod lens array significantly.

The refractive index distribution at the peripheral portion of each rod lens can differ considerably from the designed value. Therefore, in many cases, this portion cannot be used as a lens. Also, the lenses may include a light absorption layer to prevent stray light caused by total reflection at the lens side surface. Moreover, depending on the conditions for fabricating the rod lens array, the rod lenses may be arranged at a certain distance between each other. Thus, in the optical imaging system according to the configuration of the present invention, it is preferable that $r_0/R$ is in the range of $0.5 \leq r_0/R \leq 1.0$, where $r_0$ is the radius of the portion of each rod lens functioning as a lens and 2R is a distance between the optical axes of two neighboring rod lenses.

In the optical imaging system according to the configuration of the present invention, it is preferable that $Z_0/P$ is in the range of $0.5 \leq Z_0/P \leq 1.0$, where $Z_0$ is the length of the rod lenses and $P = 2\pi/g$ is a one-pitch length of the rod lenses. This preferred example can produce an erected image.

In the optical imaging system according to the configuration of the present invention, it is preferable that an overlapping degree m is in the range of $0.9 \leq m \leq 5.0$, and the overlapping degree m is given by $m = X_0/2r_0$, If where $r_0$ is the radius of the portion of each rod lens functioning as a lens and $X_0$ is an image radius that the rod lens projects onto the image plane. When the overlapping degree m is larger than 5.0, the image may become too dark and the time for scanning etc. is long. When the overlapping degree m is smaller than 0.9, the periodic irregularity in brightness of the image plane is increased.

In the optical imaging system according to the configuration of the present invention, it is preferable that a parallel plane transparent substrate is arranged so that the manuscript plane is located at the front focal position of the rod lens array. This preferred example allows the manuscript plane to be set at the front focal position by only pressing a manuscript to the surface of the transparent substrate. Moreover, it is preferable that the parallel plane transparent substrate is in contact with the lens surface of the rod lens array. This can be achieved easily by adjusting the thickness of the transparent substrate. This preferred example can simplify adjustment of the distance between the rod lens array and the front focal position during fabrication of the optical imaging system, thereby reducing the cost.

DESCRIPTION OF THE PREFERRED EMBODIMENTS

Hereinafter, the present invention will be described more specifically by way of an embodiment.

Figure 1:
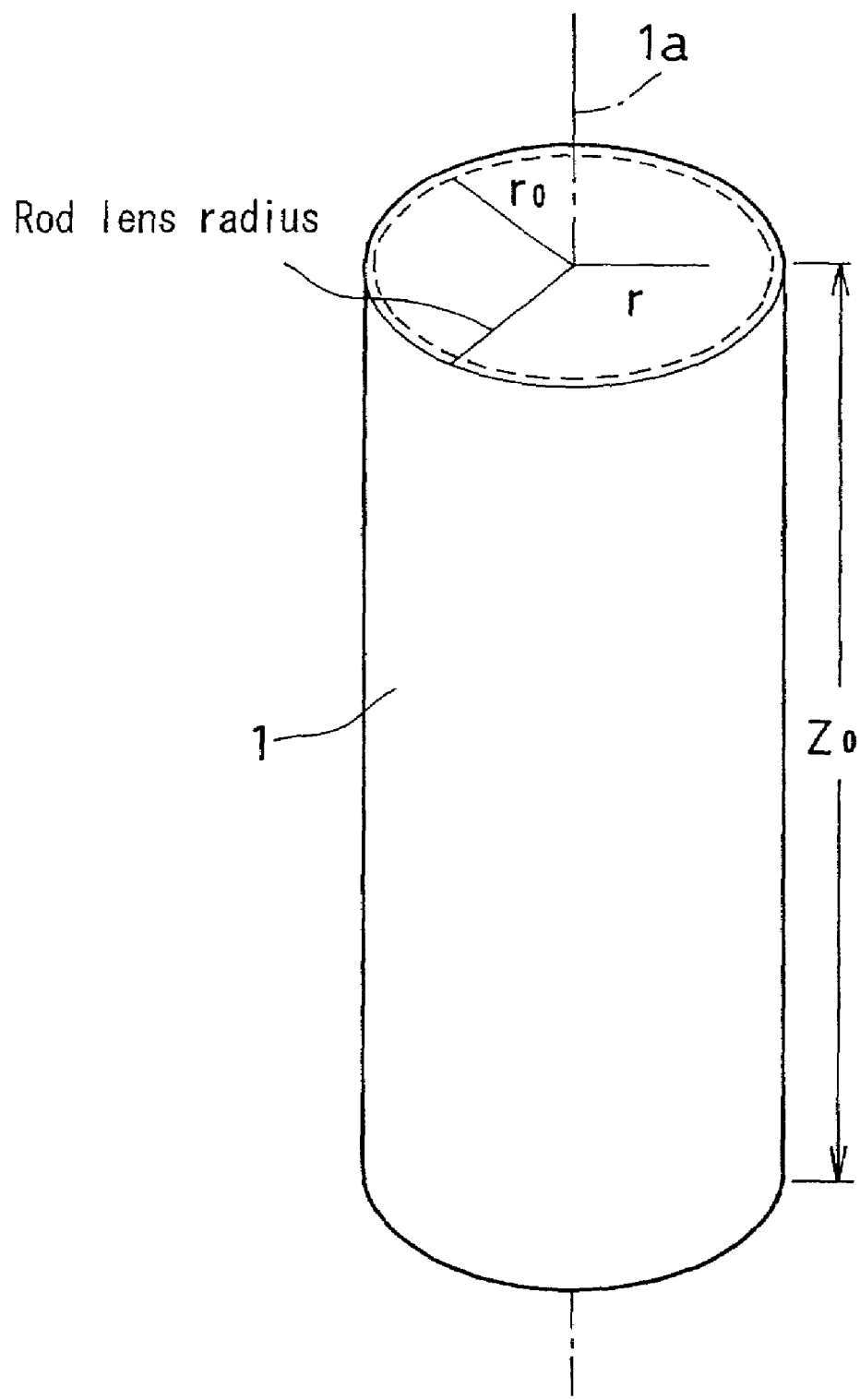
FIG. 1 is a perspective view showing a rod lens used in an optical imaging system according to an embodiment of the present invention.
Figure 2:
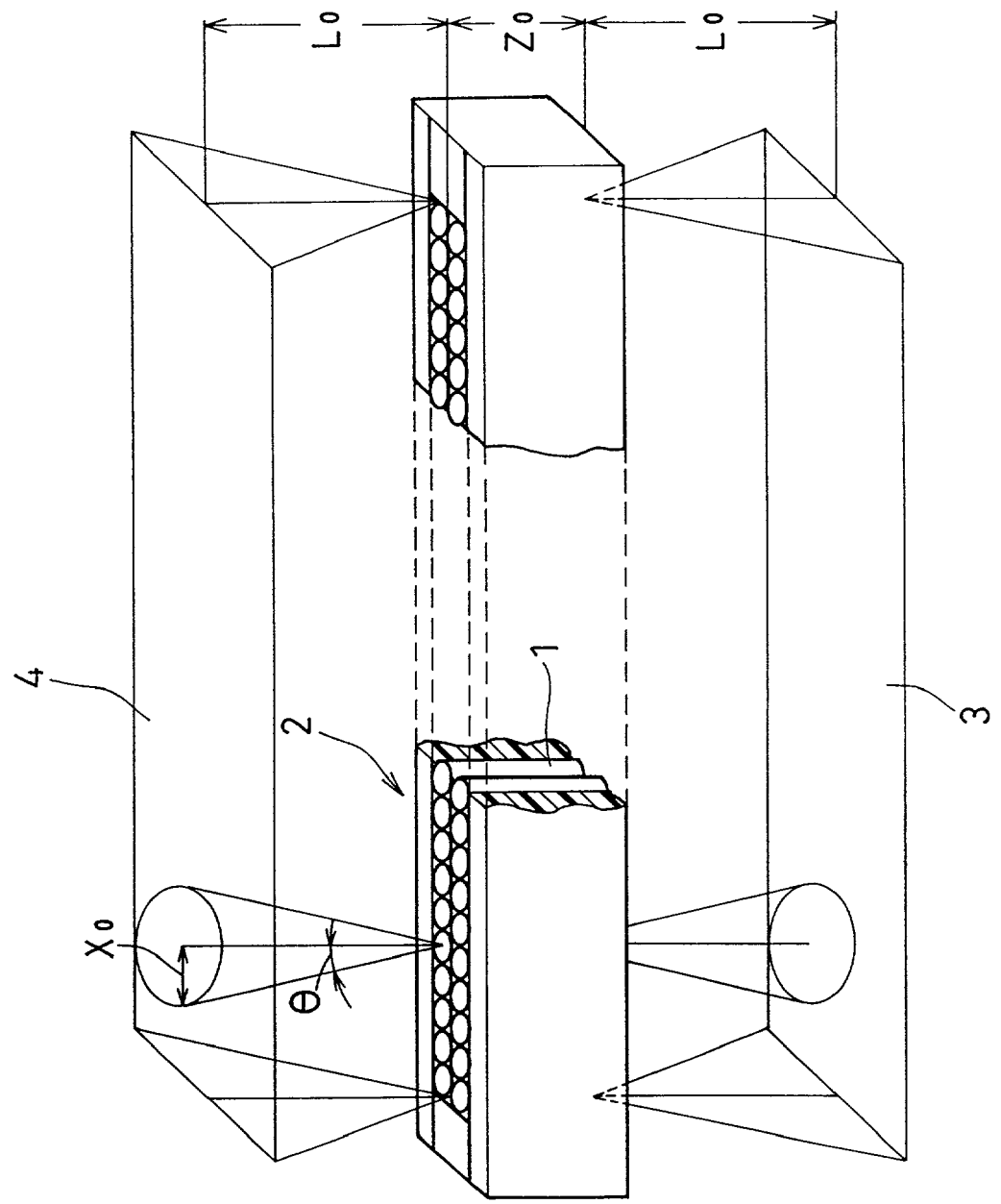
FIG. 2 is a perspective view showing an optical imaging system according to an embodiment of the present invention.

As shown in FIGS. 1 and 2, this embodiment employs a rod lens array 2 for one-to-one imaging, where a plurality of columnar rod lenses 1 having a refractive index distribution in the radial direction are arranged in two rows with their optical axes 1a in parallel. A manuscript plane 3 and an image plane 4 are located on the opposite sides of the rod lens array 2, thus providing an optical imaging system.

Figure 3:
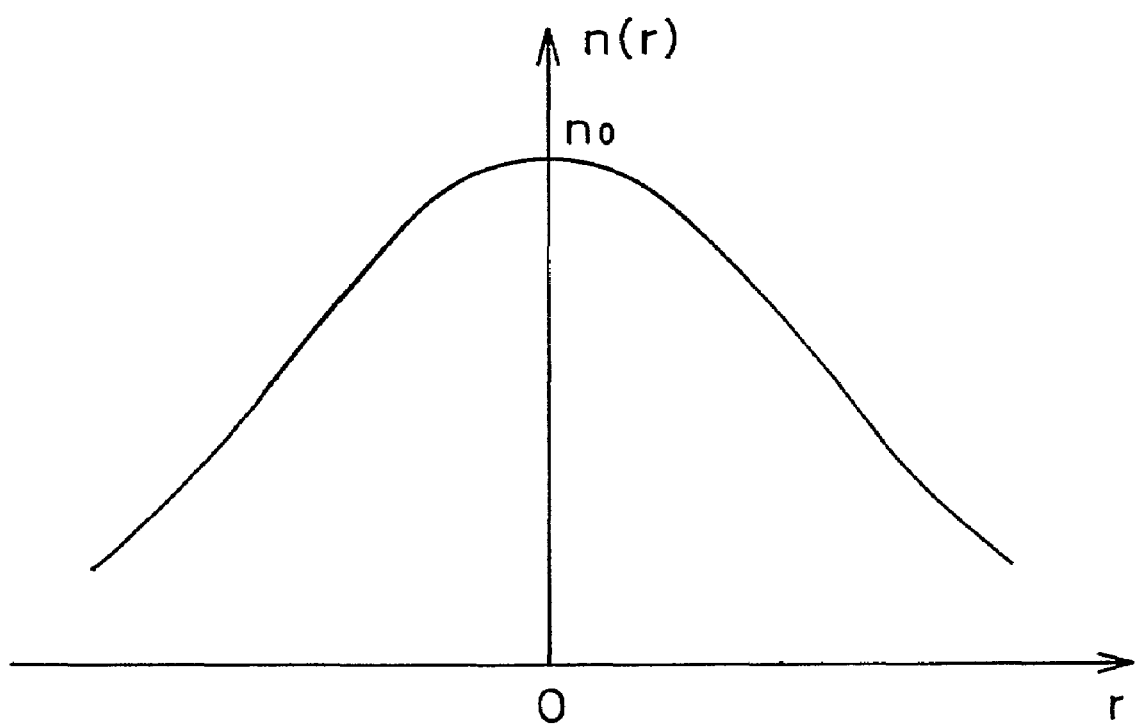
FIG. 3 is a graph of the refractive index distribution of the rod lenses used in an optical imaging system according to an embodiment of the present invention.

As shown in FIG. 3, the refractive index n of the rod lenses 1 is distributed in the radial direction, which is expressed by $$n(r)^2 = n_0^2 \cdot \{1 - (g \cdot r)^2 + h_4 \cdot (g \cdot r)^4 + h_6 \cdot (g \cdot r)^6 + h_8 \cdot (g \cdot r)^8\} \qquad \text{Eq. 13}$$

where r is a radial distance from the optical axis 1a of the rod lens 1, n(r) is the refractive index at the radial distance r, $n_0$ is the refractive index on the optical axis 1a of the rod lens 1 (i.e., the center refractive index), and g, $h_4$, $h_6$ and $h_8$ are refractive index distribution coefficients.

Figure 4:
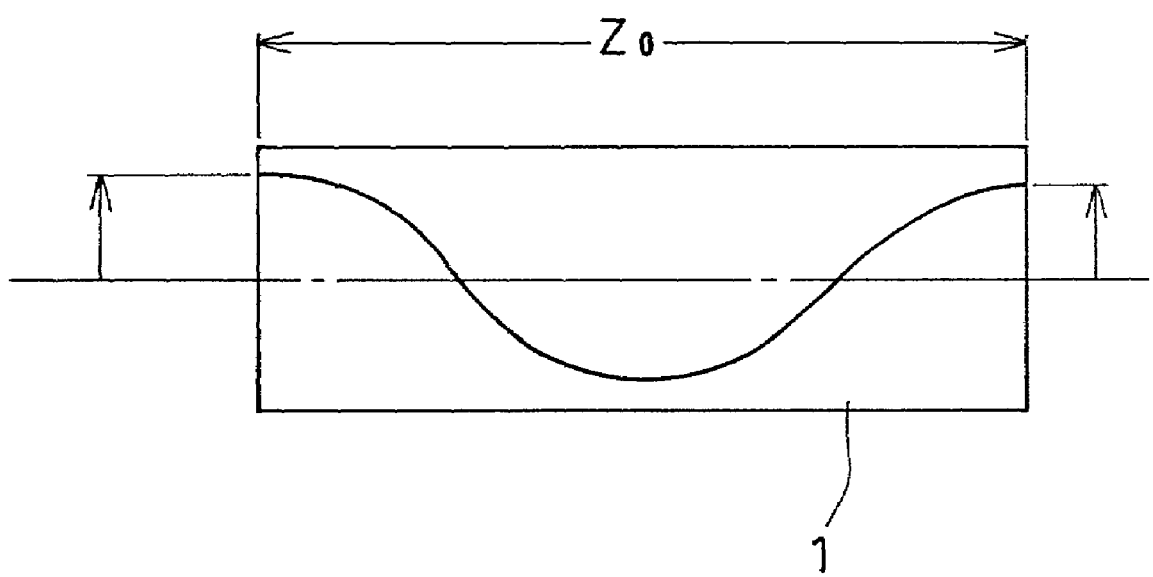
FIG. 4 is a schematic view showing the image formation by a rod lens used in an optical imaging system according to an embodiment of the present invention.

To achieve erected images as shown in FIG. 4, the ratio $Z_0/P$ of a length $Z_0$ of the rod lenses 1 and a one-pitch length $P=2\pi/g$ of the rod lenses 1 has to be in the range of $0.5 \leq Z_0/P \leq 1.0$.

The distance $L_0$ between the end surface (lens surface) of the rod lens array 2 and the manuscript plane 3 and that between the end surface (lens surface) of the rod lens array 2 and the image plane 4 (see FIG. 2) are expressed by $$L_0 = -\{1/(n_0 \cdot g)\} \cdot \tan(Z_0 \pi / P). \qquad \text{Eq. 14}$$

It is desirable that the radius $r_0$ of the effective lens portion, i.e., the radius of the portion of each rod lens 1 that functions as a lens, is in the range of 0.05 mm $\leq r_0 \leq$ 0.60 mm.

Lenses having a small $r_0$ can provide high resolution more easily because the amount of blurred image caused by various aberrations of the rod lenses 1 increases in proportion to the size of the entire lens. However, when $r_0$ is smaller than 0.05 mm, it is difficult to produce and assemble those rod lenses 1. When the radius $r_0$ of the effective lens portion of each rod lens 1 is larger than 0.60 mm, the aberrations of the rod lens array 2 become too large.

The obtainable value of the refractive index $n_0$ on the optical axis 1a of the rod lens 1 (i.e., the center refractive index) depends on the rod lens material (glass or synthetic resin) and is in the range of $1.4 \leq n_0 \leq 1.8$.

The brightness of the rod lenses 1 depends on the dimensionless factor $g \cdot r_0$ or an angular aperture that indicates the range over which the lenses can accept light. The angular aperture $\theta$ (°) is expressed by $$\theta = (n_0 \cdot g \cdot r_0)/(\pi/180). \qquad \text{Eq. 15}$$

It is desirable that the dimensionless factor $g \cdot r_0$ is in the range of $0.04 \leq g \cdot r_0 \leq 0.27$. When $g \cdot r_0$ is smaller than 0.04, the image may become too dark and the time for scanning etc. is long. When $g \cdot r_0$ is larger than 0.27, the influence of field curvature and astigmatism may become too large and the resolving power is reduced.

The desirable range of $g \cdot r_0$ corresponds to $4° \leq \theta \leq 24°$, e.g., when the center refractive index $n_0$ is 1.60.

Figure 5:
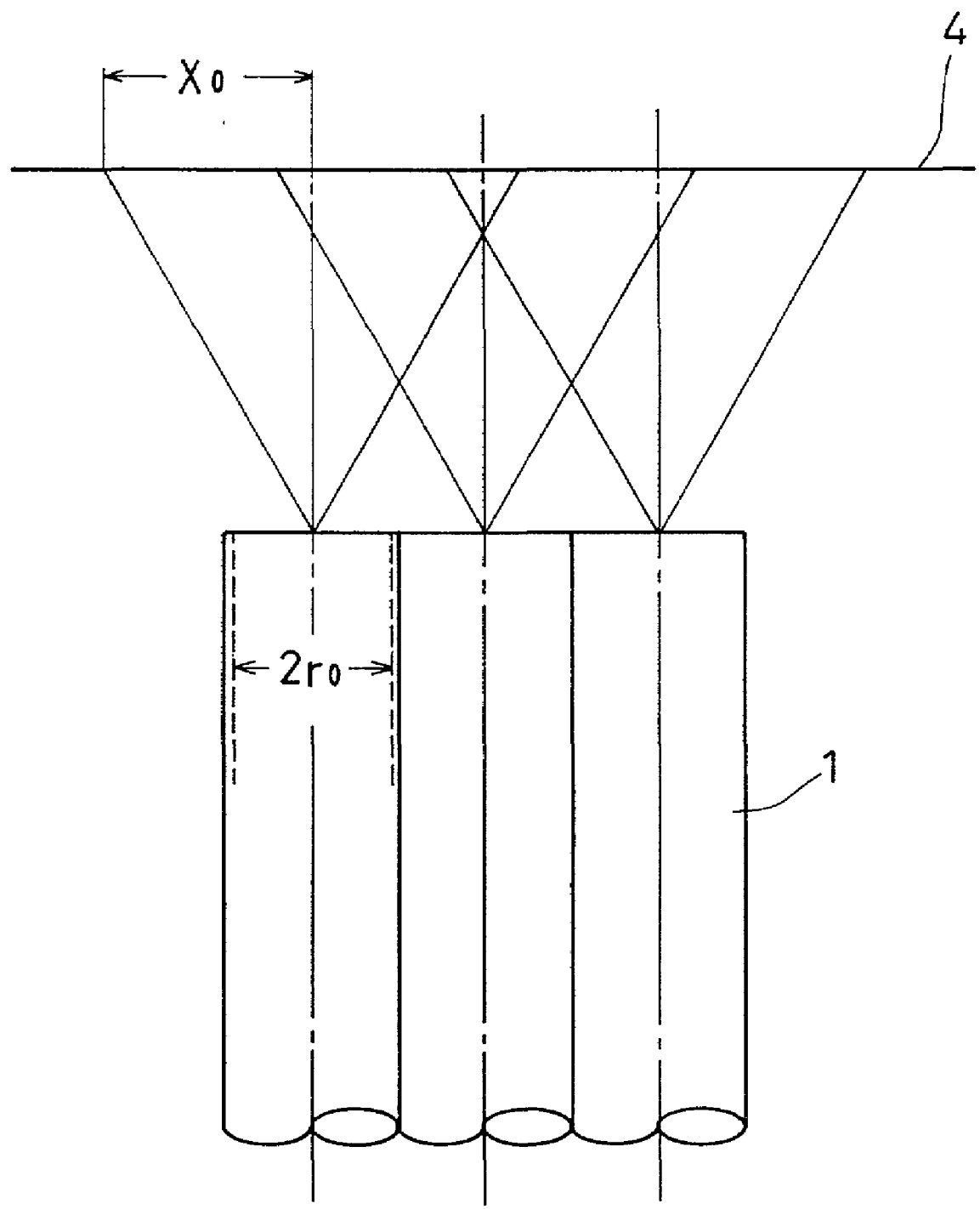
FIG. 5 is a schematic view showing the image composition by a plurality of rod lenses used in an optical imaging system according to an embodiment of the present invention.

In an optical imaging system including the above rod lens array 2, a compound image is formed by a plurality of rod lenses 1 on the image plane 4, as shown in FIG. 5. Therefore, it is convenient to use a dimensionless factor that represents the amount of overlap, i.e., a so-called "overlapping degree". This overlapping degree m is expressed by $$m = X_0/2r_0 \qquad \text{Eq. 16}$$

where $X_0$ is the image radius (field of view) that the single rod lens 1 projects onto the image plane 4 and is defined by $X_0 = -r_0/\cos(Z_0\pi/P)$.

It is desirable that the overlapping degree m of the rod lens array 2 is in the range of $0.9 \leq m \leq 5.0$. When the overlapping degree m is larger than 5.0, the image may become too dark and the time for scanning etc. is long. When the overlapping degree m is smaller than 0.9, the periodic irregularity in brightness of the image plane 4 is increased.

It is most desirable to match the distance 2R between the optical axes of neighboring rod lenses 1 with 2 $r_0$ (i.e., a diameter of the effective lens portion of each rod lens 1). This is because the largest quantity of light can be focused on the image. However, the refractive index distribution at the peripheral portion of the rod lens 1 can differ considerably from the designed value. Therefore, in many cases, this portion cannot be used as a lens. Also, the lenses may include a light absorption layer to prevent stray light caused by total reflection at the lens side surface. Moreover, depending on the conditions for fabricating the rod lens array 2, the rod lenses 1 may be arranged with a certain distance between each other. Considering the above circumstances, the ratio $r_0/R$ may be set so as to be in the range of $0.5 \leq r_0/R \leq 1.0$.

When developing the present invention, the inventors took the standard for "high resolution" to mean "a value of at least 50% for the MTF of a 24 line-pairs/mm pattern on the center line of a rod lens array 2 including a plurality of rod lenses 1, which have an effective lens portion radius $r_0$ of 0.15 mm and are arranged in two rows with their optical axes 1a in parallel", and determined the refractive index distribution coefficients $h_4$, $h_6$ and $h_8$ that satisfy this standard.

Figure 6:
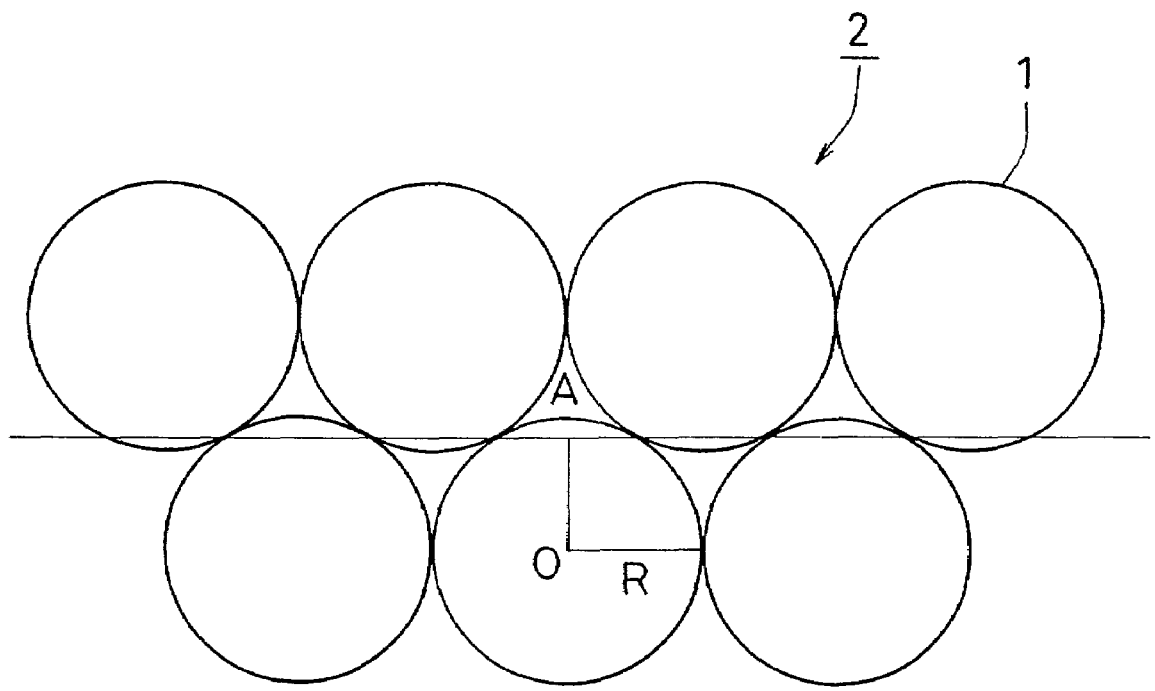
FIG. 6 is a schematic view showing the measurement point of the MTF value of an optical imaging system according to an embodiment of the present invention.

Specifically, a rod lens array 2 having the above configuration was designed. Ray tracing was performed by taking the perpendicular projection of a point A as indicated in FIG. 6 onto the object plane for the light source. The MTF values of a 24 line-pairs/mm pattern were calculated for the X direction and for the Y direction, and the smaller value was taken as the MTF value for the rod lens array 2. The optical design software "Olso Six" by Sinclair Optics (US) was used for the ray tracing. Table 1 shows the specifications of twenty-four types of rod lens arrays 2 used for the calculation. The angular aperture θ ranges from 7 to 20°, the center refractive index $n_0$ of the rod lenses 1 ranges from 1.5 to 1.8, the overlapping degree m ranges from 1.0 to 2.5, and the radius $r_0$ of the portion of each rod lens 1 that functions as a lens is set to 0.3 mm. For each of the rod lens arrays 2, a range of the refractive index distribution coefficients $h_4$, $h_6$ and $h_8$ over which the MTF value of a 24 line-pairs/mm pattern is at least 50% was determined. Hereinafter, this range is referred to as "good image range" of the refractive index distribution coefficients $h_4$, $h_6$ and $h_8$.

TABLE 1

| No. | θ(°) | $n_0$ | $r_0$(mm) | m |
|---|---|---|---|---|
| 1 | 18.00 | 1.65 | 0.3 | 1.0 |
| 2 | 18.00 | 1.65 | 0.3 | 1.5 |
| 3 | 18.00 | 1.65 | 0.3 | 2.0 |
| 4 | 18.00 | 1.65 | 0.3 | 2.5 |
| 5 | 12.00 | 1.65 | 0.3 | 1.0 |
| 6 | 12.00 | 1.65 | 0.3 | 1.5 |
| 7 | 12.00 | 1.65 | 0.3 | 2.0 |
| 8 | 12.00 | 1.65 | 0.3 | 2.5 |
| 9 | 8.00 | 1.65 | 0.3 | 1.0 |
| 10 | 8.00 | 1.65 | 0.3 | 1.5 |
| 11 | 8.00 | 1.65 | 0.3 | 2.0 |
| 12 | 8.00 | 1.65 | 0.3 | 2.5 |
| 13 | 19.70 | 1.80 | 0.3 | 1.0 |
| 14 | 19.70 | 1.80 | 0.3 | 2.5 |
| 15 | 16.32 | 1.50 | 0.3 | 1.0 |
| 16 | 16.32 | 1.50 | 0.3 | 2.5 |
| 17 | 13.11 | 1.80 | 0.3 | 1.0 |
| 18 | 13.11 | 1.80 | 0.3 | 2.5 |
| 19 | 10.90 | 1.50 | 0.3 | 1.0 |
| 20 | 10.90 | 1.50 | 0.3 | 2.5 |
| 21 | 8.73 | 1.80 | 0.3 | 1.0 |
| 22 | 8.73 | 1.80 | 0.3 | 2.5 |
| 23 | 7.27 | 1.50 | 0.3 | 1.0 |
| 24 | 7.27 | 1.50 | 0.3 | 2.5 |

Figure 7:
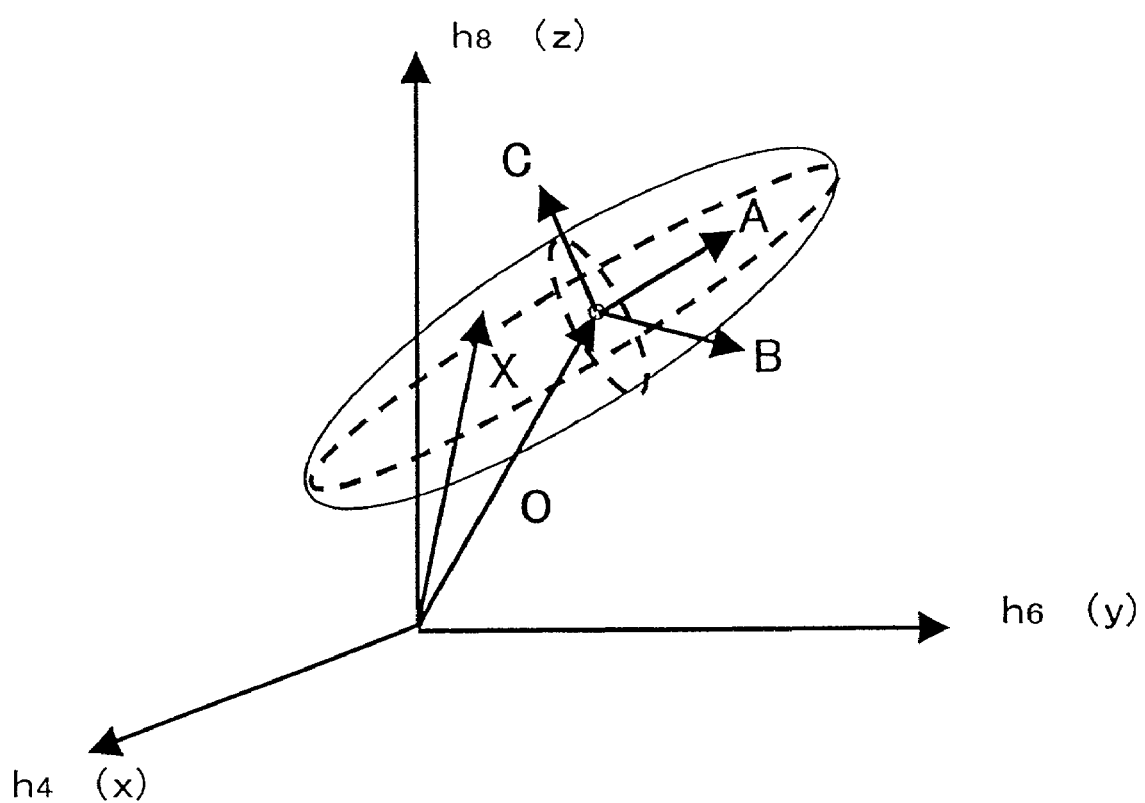
FIG. 7 shows a "good image range" for the refractive index distribution coefficients $h_4$, $h_6$, and $h_8$ of the rod lenses used in an optical imaging system according to an embodiment of the present invention.

Under any of the conditions shown in Table 1, a vector X* (hereinafter, vectors are accompanied by "*") that represents the good image range can be described as a long and narrow spheroid in a Cartesian coordinate system with $h_4$ being x-axis, $h_6$ being y-axis and $h_8$ being z-axis, as shown in FIG. 7. Since FIG. 7 is a schematic view, the dimensions of the axes, the position and shape of the spheroid, or the like do not correspond to the specific values of the good image range, which will be described below.

The vector X* is expressed by $$X^* = (x, y, z) = O^* + k_A A^* + k_B B^* + k_C C^*$$  Eq. 17 where $k_A$, $k_B$ and $k_C$ are the constants that satisfy the relationship given by $$k_A^2 + k_B^2 + k_C^2 \leq 1,$$  Eq. 18

O* is a vector from the origin of the Cartesian coordinate system to the center of the spheroid, and A*, B* and C* are vectors in the directions of the major axis, the mean axis (intermediate axis) and the minor axis of the spheroid, respectively. The vector O* is referred to as "center vector", and the vectors A*, B* and C* are referred to as "major vector", "mean vector" and "minor vector" in the following description.

The good image range can be determined by these vectors O*, A*, B* and C*, each of which depends on the characteristic parameters of the lenses, such as the angular aperture θ, the center refractive index no, and the overlapping degree m. The relationship between the vectors and the characteristic parameters will be described below.

(1) Center Vector O*

The components of the center vector O* on the x-axis, y-axis and z-axis can be represented by $x_0$, $y_0$ and $z_0$, respectively. That is, the center vector O* is expressed by $$O^* = (x_0, y_0, z_0).$$  Eq. 19

The dependency of each component upon the characteristic parameters of the lenses is determined by simulation.

Figure 8:
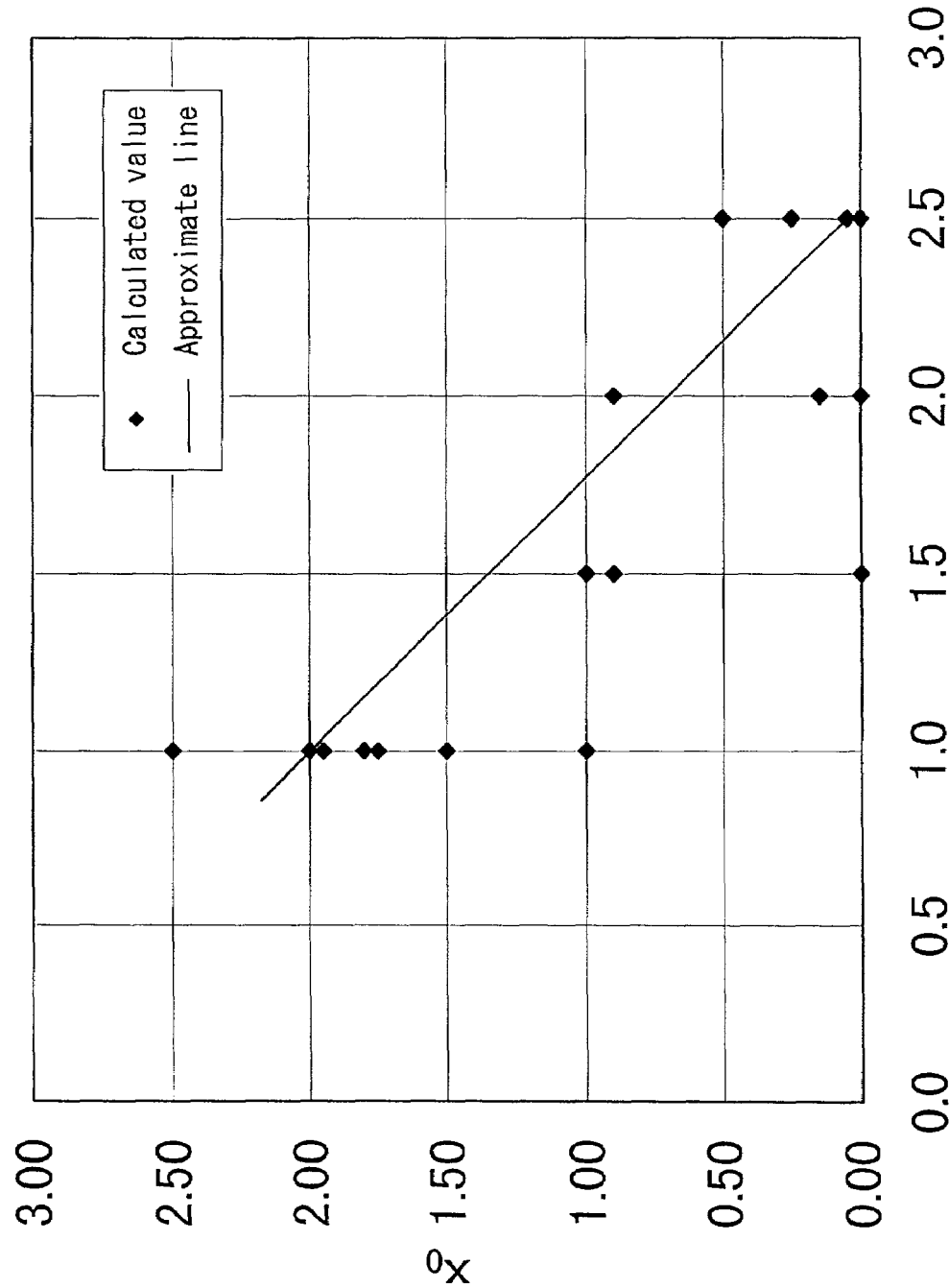
FIG. 8 shows the dependency of $x_0$ upon an overlapping degree m that determines the good image range for the refractive index distribution coefficients $h_4$, $h_6$, and $h_8$ of the rod lenses used in an optical imaging system according to an embodiment of the present invention.

FIG. 8 shows the dependency of $x_0$ upon the overlapping degree m, which is calculated for the rod lens arrays 2 appropriately selected from Table 1. As shown in FIG. 8, an approximate line is determined based on the calculated values and expressed by $$x_0 = -1.3m + 3.3.$$  Eq. 20

Figure 9:
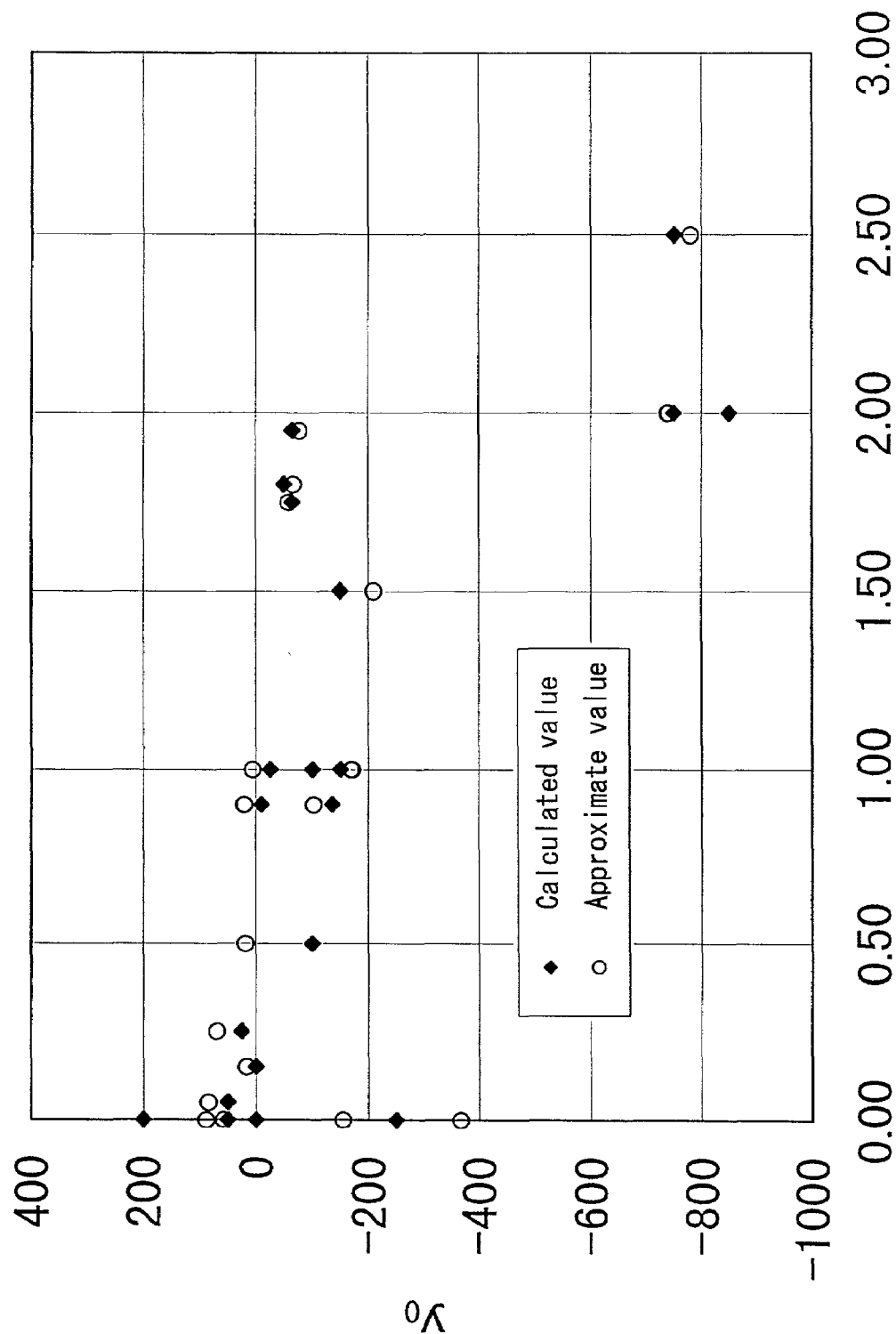
FIG. 9 shows the dependency of $y_0$ upon $x_0$ that determines the good image range for the refractive index distribution coefficients $h_4$, $h_6$, and $h_8$ of the rod lenses used in an optical imaging system according to an embodiment of the present invention.

FIG. 9 shows the dependency of $y_0$ upon $x_0$, which is calculated for the rod lens arrays 2 appropriately selected from Table 1. Taking the deviation from a linear relationship between the two components into consideration, the dependency can be approximated by $$y_0 = -80x_0 + 16(m-2.6)(10-\theta \cdot n_0)^2 + 100.$$  Eq. 21

Substitution of $x_0$ from Equation 20 into Equation 21 yields an approximate value of $y_0$, represented by a white dot in FIG. 9. As can be seen from FIG. 9, these approximate values agree well with the exactly calculated values of $y_0$.

Figure 10:
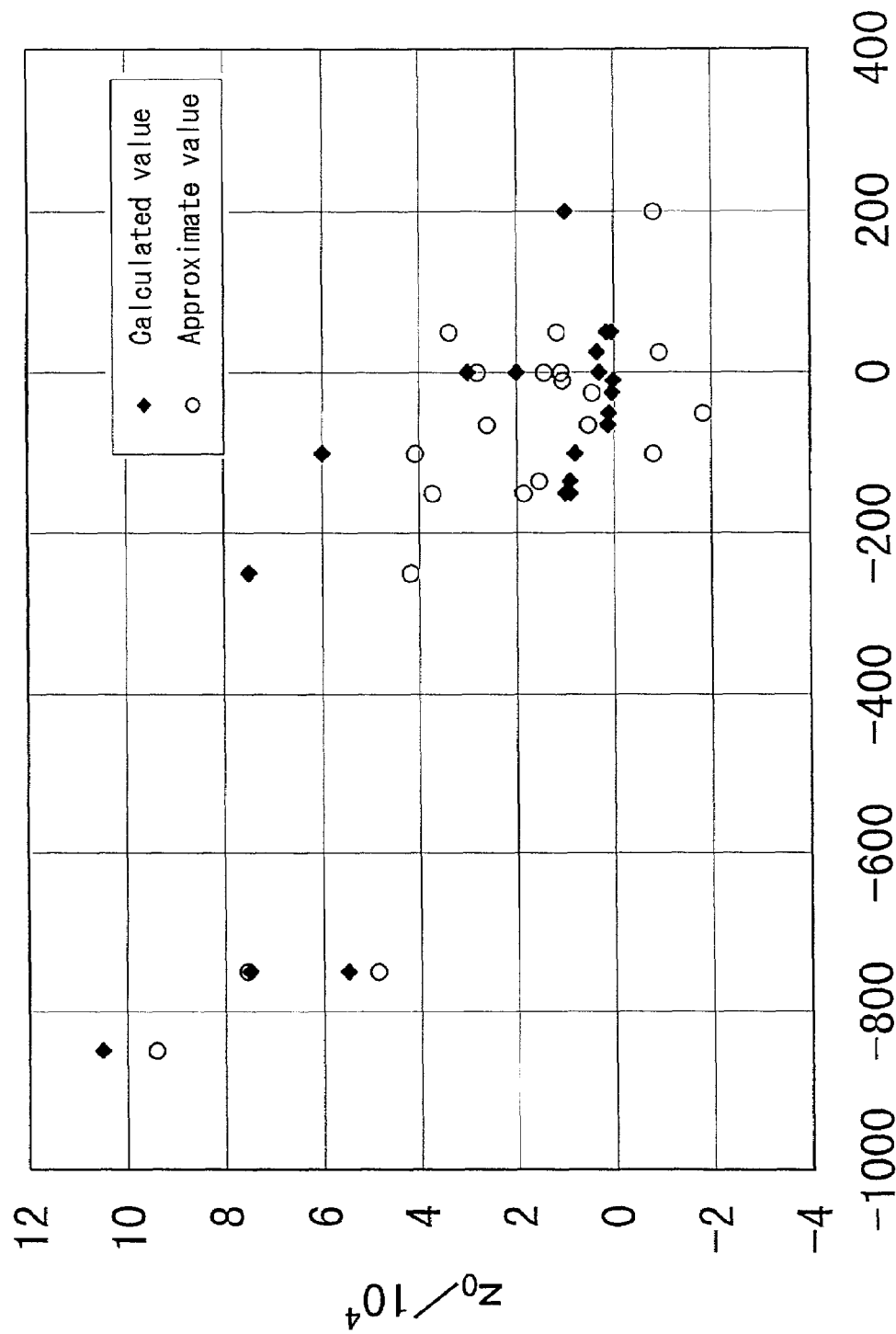
FIG. 10 shows the dependency of $z_0$ upon $y_0$ that determines the good image range for the refractive index distribution coefficients $h_4$, $h_6$, and $h_8$ of the rod lenses used in an optical imaging system according to an embodiment of the present invention.

FIG. 10 shows the dependency of $z_0$ upon $y_0$, which is calculated for the rod lens arrays 2 appropriately selected from Table 1. Taking the deviation from a linear relationship between the two components into consideration, the dependency can be approximated by $$z_0 = -100y_0 + 15000m - 150000n_0 + 230000.$$  Eq. 22

Substitution of the approximate value of $y_0$, which has been obtained by substituting $x_0$ from Equation 20 into Equation 21, into Equation 22 yields an approximate value of $z_0$, represented by a white dot in FIG. 10. As can be seen from FIG. 10, these approximate values agree well with the exactly calculated values of $z_0$.

(2) Major Vector A*

The components of the major vector A* on the x-axis, y-axis and z-axis can be represented by $A_x$, $A_y$ and $A_z$, respectively. That is, the major vector A* is expressed by $$A^* = (A_x, A_y, A_z).$$  Eq. 23

Figure 11:
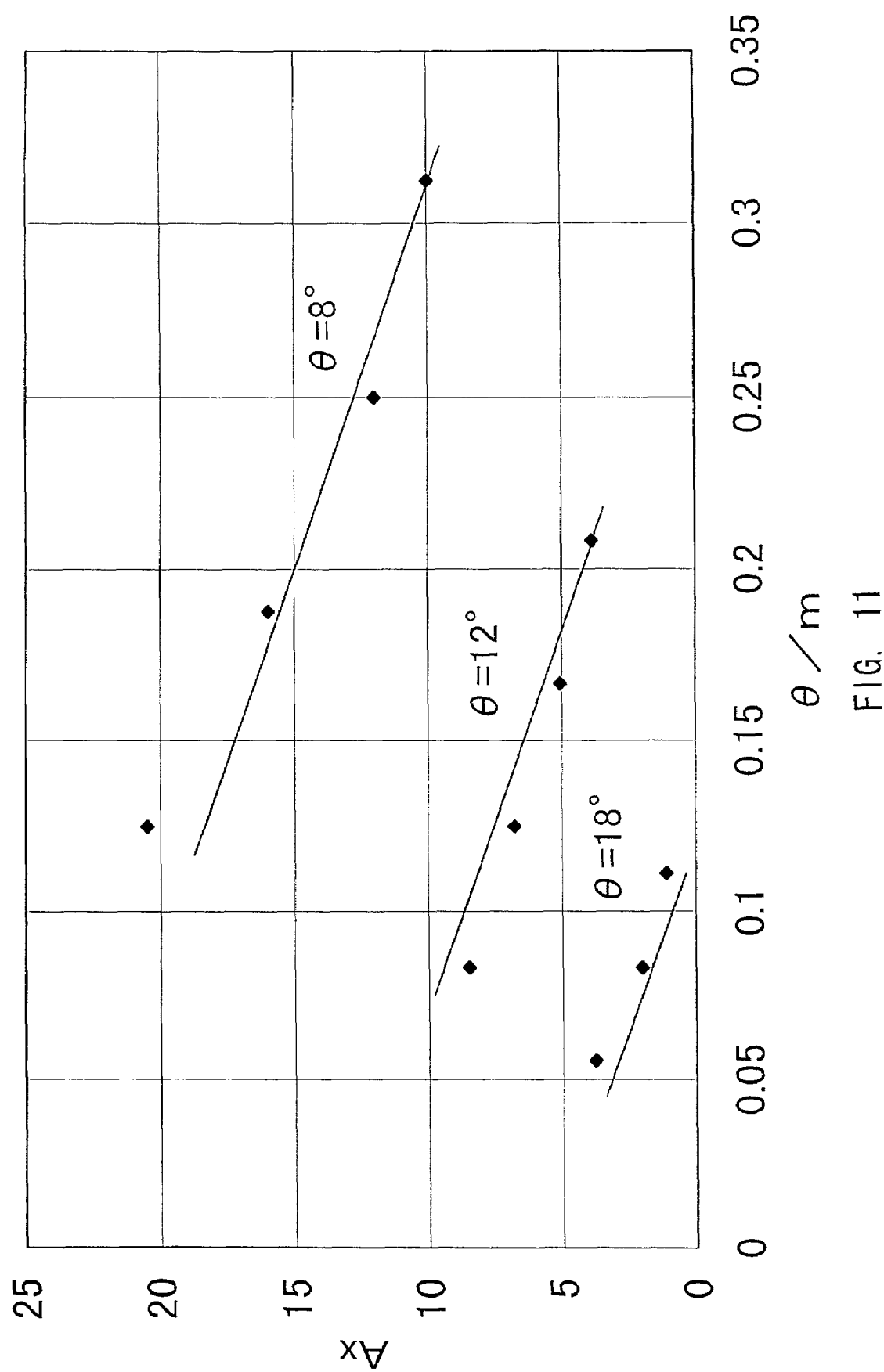
FIG. 11 shows the dependency of $A_x$ upon $m/\theta$ that determines the good image range for the refractive index distribution coefficients $h_4$, $h_6$, and $h_8$ of the rod lenses used in an optical imaging system according to an embodiment of the present invention.

FIG. 11 shows the dependency of $A_x$ upon m/θ. Here, among the twenty-four types of rod lens arrays 2 in Table 1, the dependency is calculated for three to four types of rod lens arrays 2 having the same angular aperture θ and different overlapping degrees m when the angular aperture is 8°, 12° and 18°, respectively. As can be seen from FIG. 11, the dependency for each angular aperture $\theta$ can be approximated by a straight line. The approximation is expressed by $$A_x = 10^{(1.9-0.0650)} - 45(m/\theta).$$  Eq. 24

Figure 12:
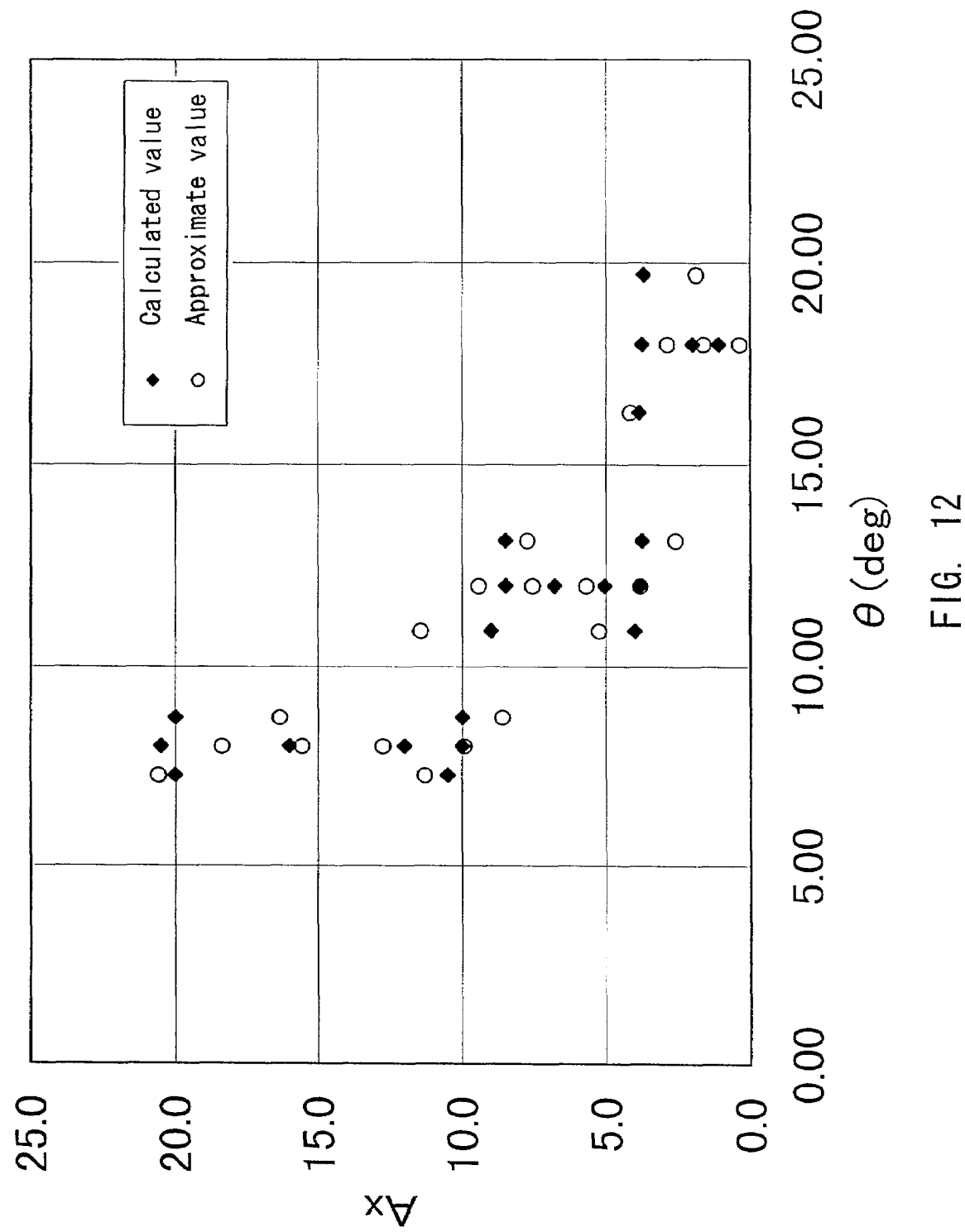
FIG. 12 shows the dependency of $A_x$ upon $\theta$ that determines the good image range for the refractive index distribution coefficients $h_4$, $h_6$, and $h_8$ of the rod lenses used in an optical imaging system according to an embodiment of the present invention.

FIG. 12 shows the dependency of Ax (the exactly calculated values) upon $\theta$, which is calculated for the rod lens array 2 appropriately selected from Table 1 and the dependency of Ax (the approximate values) upon $\theta$, which is obtained from Equation 24. As can be seen from FIG. 12, the approximate values agree well with the exactly calculated values.

Figure 13:
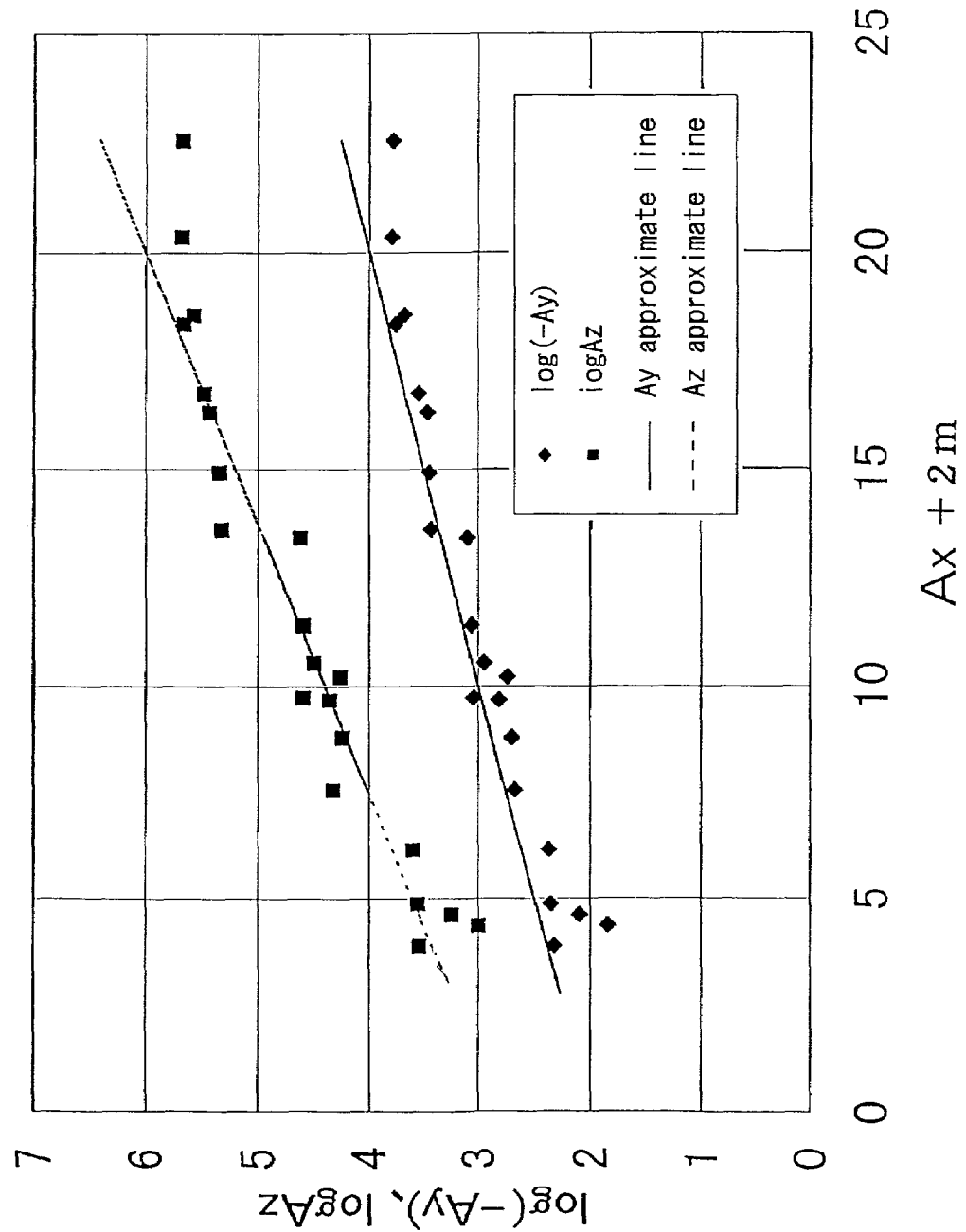
FIG. 13 shows the dependency of $\log_{10}(-A_y)$ upon $(A_x + 2m)$ and that of $\log_{10}A_z$ upon $(A_x + 2m)$, each of which determines the good image range for the refractive index distribution coefficients $h_4$, $h_6$, and $h_8$ of the rod lenses used in an optical imaging system according to an embodiment of the present invention.

FIG. 13 shows the dependency of $\log_{10}(-A_y)$ upon $(A_x+2m)$ and that of $\log_{10}A_z$ upon $(A_x+2m)$, each of which is calculated for the rod lens arrays 2 appropriately selected from Table 1. The dependency of $\log_{10}(-A_y)$ can be approximated by a linear relationship given by $$\log_{10}(-A_y) = 2 + 0.1(A_x+2m).$$  Eq. 25

Similarly, the dependency of $\log_{10}A_z$ can be approximated by a linear relationship given by $$\log_{10}A_z = 2.8 + 0.16(A_x+2m).$$  Eq. 26

The approximate lines of Equations 25 and 26 are illustrated in FIG. 13.

(3) Mean Vector B*

The components of the mean vector B* on the x-axis, y-axis and z-axis can be represented by $B_x$, $B_y$ and $B_z$, respectively. That is, the mean vector B* is expressed by $$B^* = (B_x, B_y, B_z).$$  Eq. 27

Figure 14:
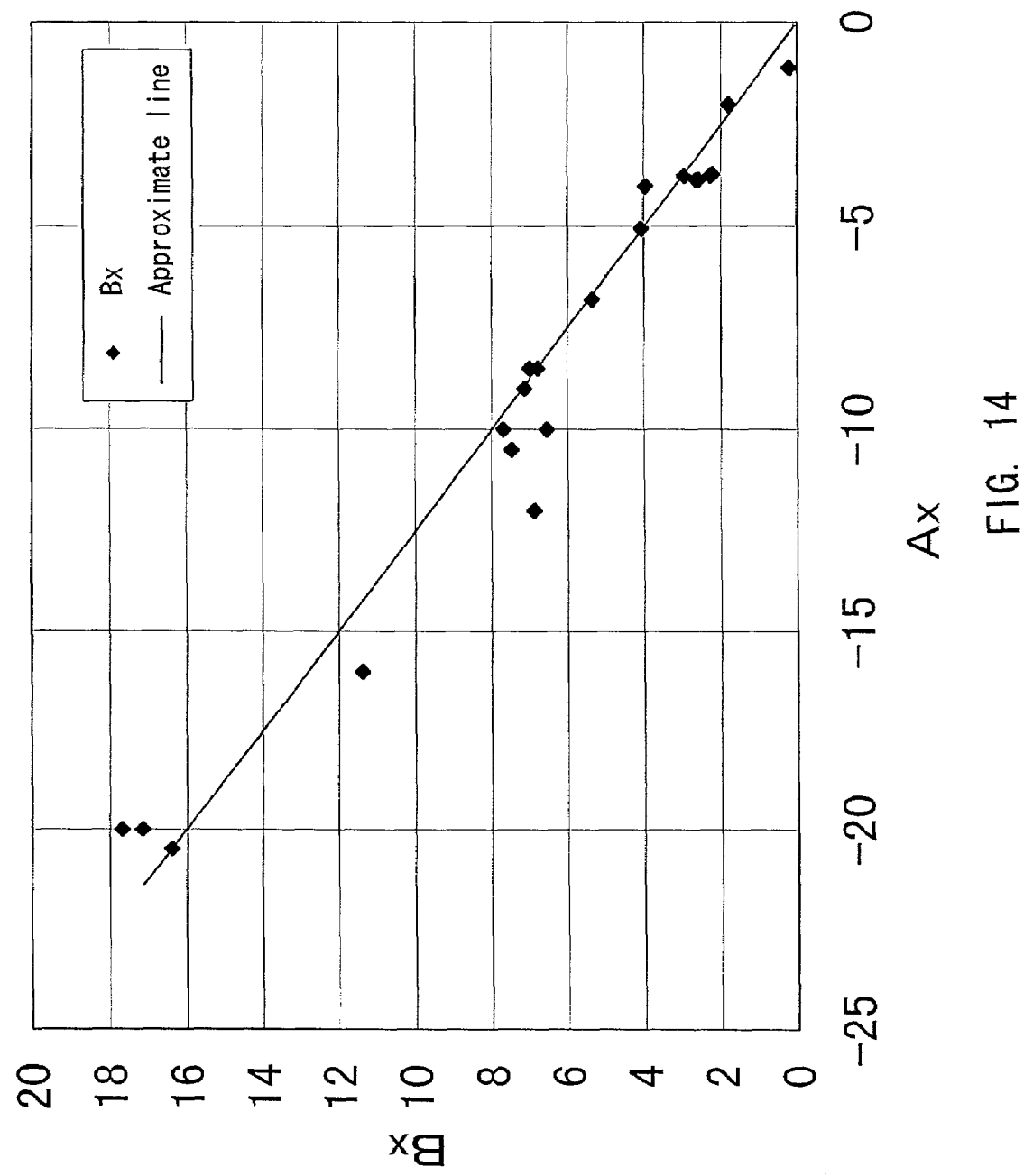
FIG. 14 shows the dependency of $B_x$ upon $A_x$ that determines the good image range for the refractive index distribution coefficients $h_4$, $h_6$, and $h_8$ of the rod lenses used in an optical imaging system according to an embodiment of the present invention.
Figure 15:
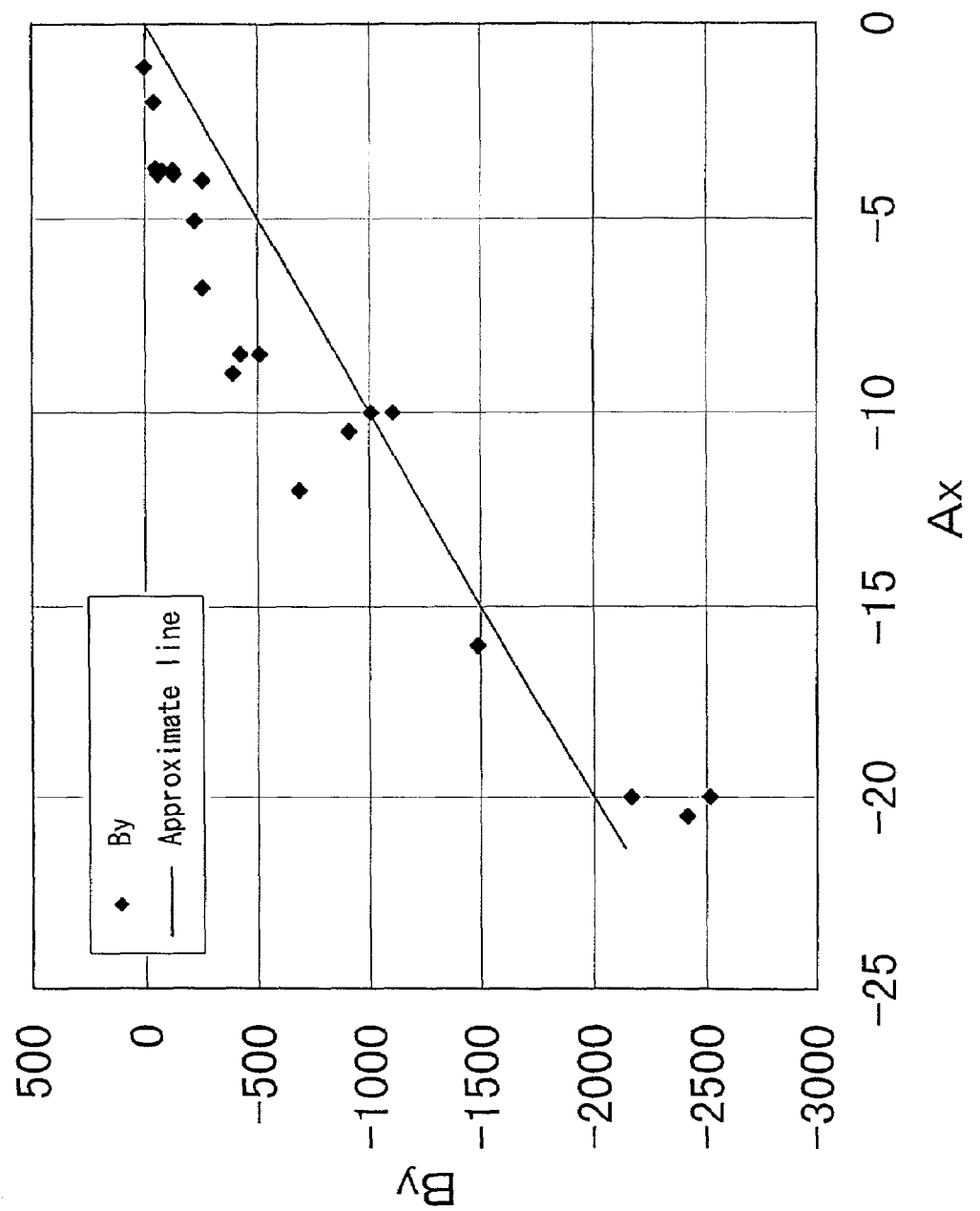
FIG. 15 shows the dependency of $B_y$ upon $A_x$ that determines the good image range for the refractive index distribution coefficients $h_4$, $h_6$, and $h_8$ of the rod lenses used in an optical imaging system according to an embodiment of the present invention.
Figure 16:
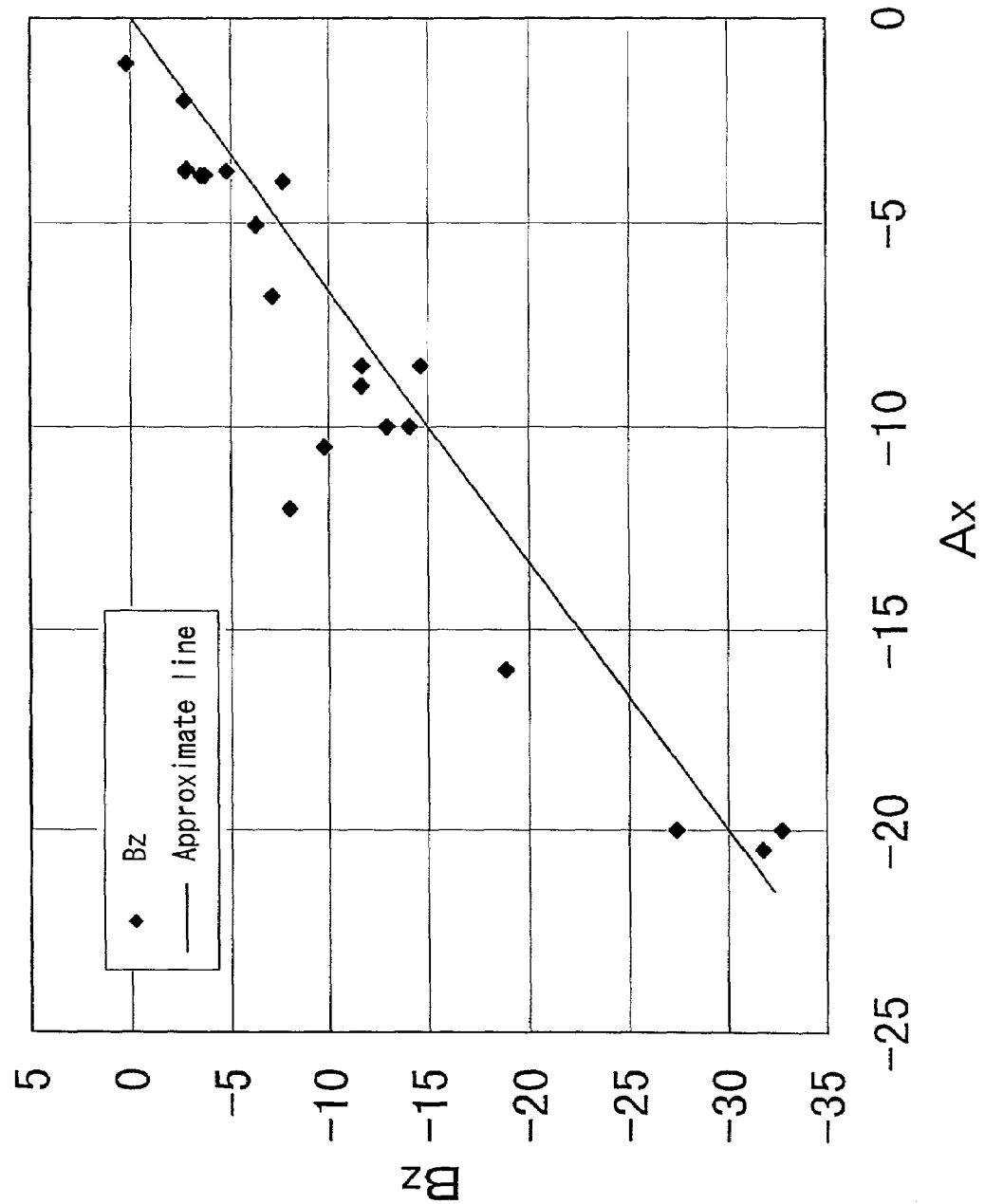
FIG. 16 shows the dependency of $B_z$ upon $A_x$ that determines the good image range for the refractive index distribution coefficients $h_4$, $h_6$, and $h_8$ of the rod lenses used in an optical imaging system according to an embodiment of the present invention.

Since the major vector A* and the mean vector B* are perpendicular to each other, B* can be calculated by determining the coordinates of a point on an ellipse including A* and B*, or the like. As shown in FIGS. 14 to 16, each of the three components of B*, which is calculated for the rod lens arrays 2 appropriately selected from Table 1, can be approximated by a linear relationship with $A_x$. The approximations as shown in FIGS. 14 to 16 are expressed by $$B_x = -0.8A_x,$$  Eq. 28

$$B_y = 100A_x \text{ and}$$  Eq. 29

$$B_z = 1.5A_x, \text{ respectively}.$$  Eq. 30

(4) Minor Vector C*

First, a plane including the major axis and the mean axis is expressed by $$px + qy + sz = 1$$  Eq. 31 where p, q and s are the x-, y-, and z-components of a normal vector to the plane.

Figure 17:
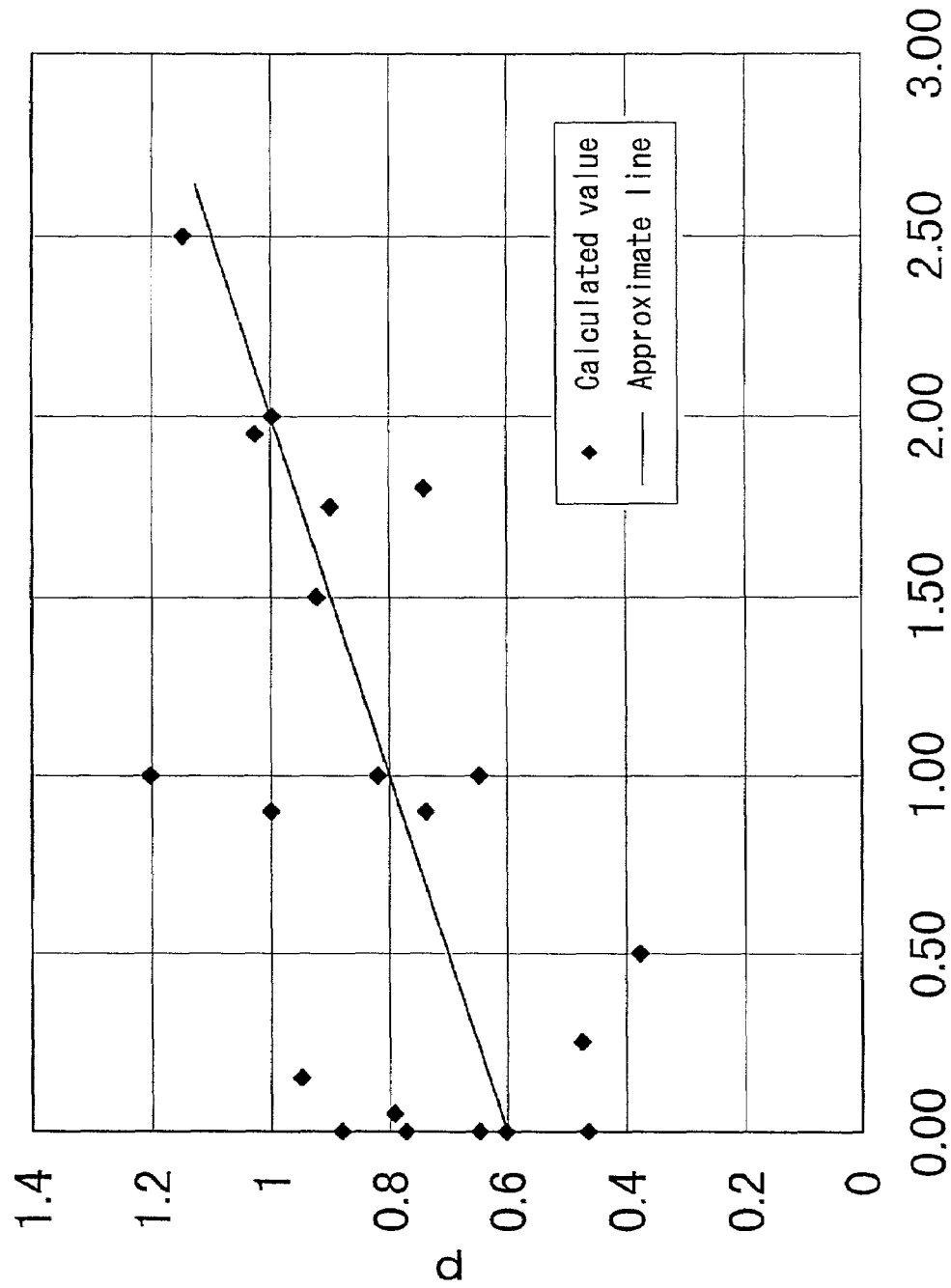
FIG. 17 shows the dependency of p upon $x_0$ that determines the good image range for the refractive index distribution coefficients $h_4$, $h_6$, and $h_8$ of the rod lenses used in an optical imaging system according to an embodiment of the present invention.
Figure 18:
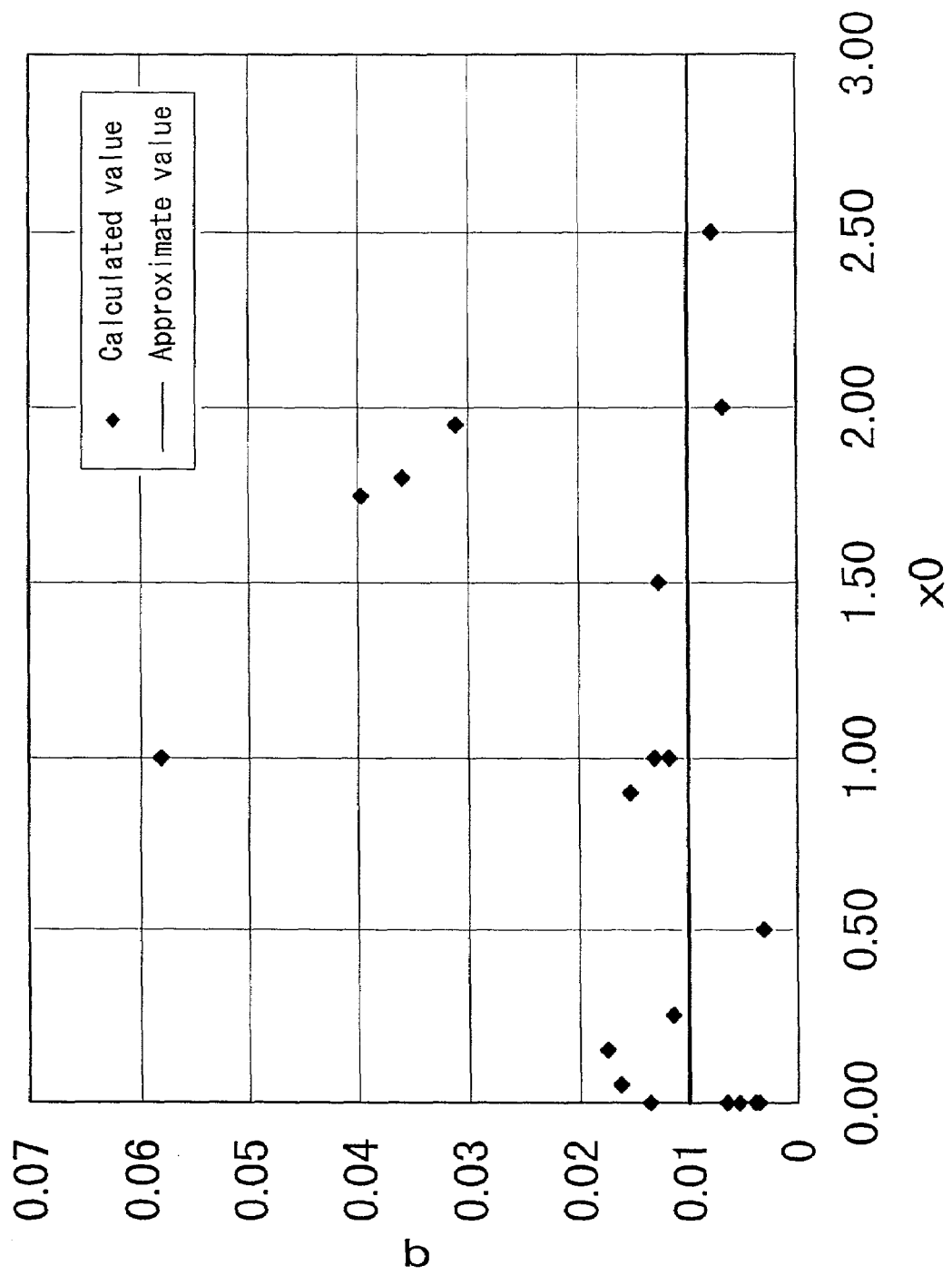
FIG. 18 shows the dependency of q upon $x_0$ that determines the good image range for the refractive index distribution coefficients $h_4$, $h_6$, and $h_8$ of the rod lenses used in an optical imaging system according to an embodiment of the present invention.
Figure 19:
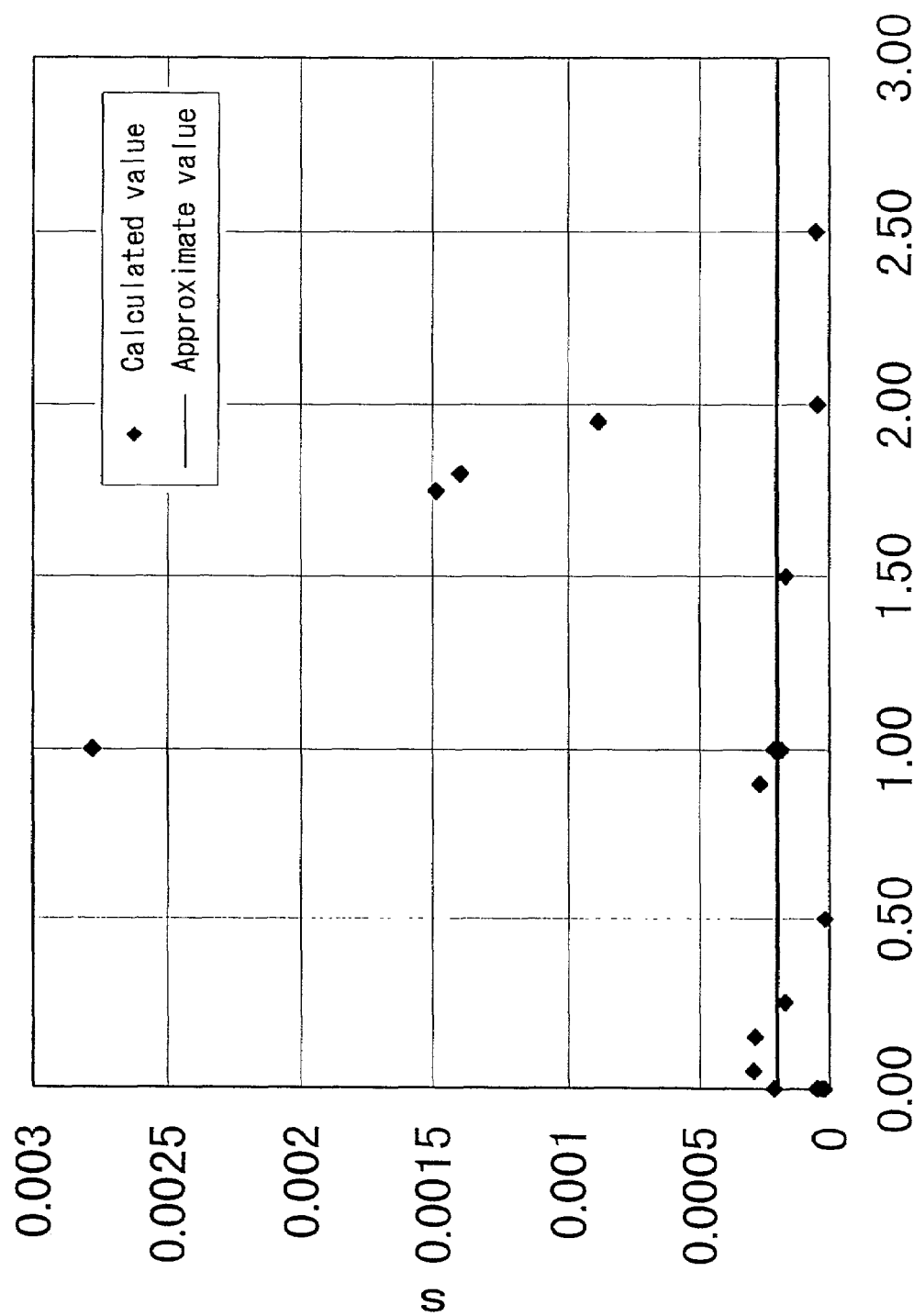
FIG. 19 shows the dependency of s upon $x_0$ that determines the good image range for the refractive index distribution coefficients $h_4$, $h_6$, and $h_8$ of the rod lenses used in an optical imaging system according to an embodiment of the present invention.

FIGS. 17 to 19 show the dependency of p, q and s upon $x_0$, each of which is calculated for the rod lens arrays 2 appropriately selected from Table 1. As shown in FIGS. 17 to 19, p can be approximated by a substantially linear relationship with $x_0$, while q and s, though there are variations in their dependency, can be approximated by a constant value. The approximations as shown in FIGS. 17 to 19 are expressed by $$p = 0.2x_0 + 0.6,$$  Eq. 32

$$q = 0.01 \text{ and}$$  Eq. 33

$$s = 0.0002, \text{ respectively}.$$  Eq. 34

The minor vector C* is a vector having the direction perpendicular to the plane including the major axis and the mean axis. Here, the minor vector C* is expressed by $$C^* = |C^*|(p', q', s')$$  Eq. 35 where p', q' and s' are the x-, y-, and z-components of a unit vector having the direction of C*. Therefore, p', q' and s' satisfy the relationship given by $$p'^2 + q'^2 + s'^2 = 1.$$  Eq. 36

Since a vector (p', q', s') is parallel to a vector (p, q, s), each of the components is expressed by $$p' = p/(p^2+q^2+s^2)^{1/2},$$  Eq. 37

$$q' = q/(p^2+q^2+s^2)^{1/2} \text{ and}$$  Eq. 38

$$s' = s/(p^2+q^2+s^2)^{1/2}.$$  eq. 39

Figure 20:
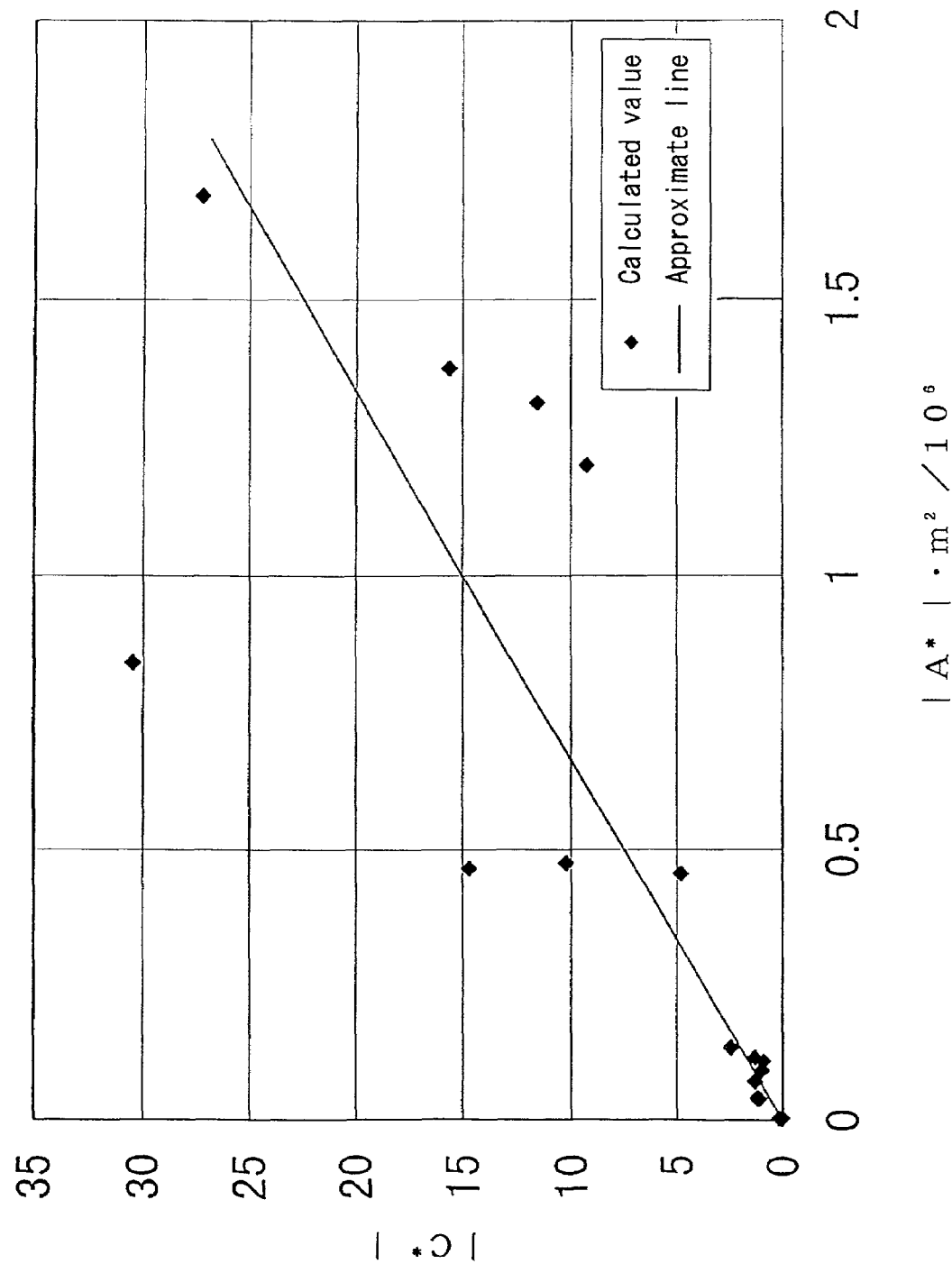
FIG. 20 shows the dependency of $|C^*|$ upon $|A^*| \cdot m^2$ that determines the good image range for the refractive index distribution coefficients $h_4$, $h_6$, and $h_8$ of the rod lenses used in an optical imaging system according to an embodiment of the present invention.

FIG. 20 shows the dependency of $|C^*|$ upon $|A^*|\cdot m^2$, which is calculated for the rod lens arrays 2 appropriately selected from Table 1. As shown in FIG. 20, $|C^*|$ and $|A^*|\cdot m^2$ are approximated by a linear relationship. Here, $|A^*|$ is expressed by $$|A^*| = (A_x^2 + A_y^2 + A_z^2)^{1/2}.$$  Eq. 40

Therefore, the approximation is expressed by $$|C^*| = 1.5 \times 10^{-5} |A^*| \cdot m^2.$$  Eq. 41

When the radius $r_0$ of the effective lens portion of each rod lens 1 takes a value other than 0.15 mm, the amount of blurred image caused by various aberrations of the rod lenses 1 increases in proportion to $r_0$. Accordingly, the good image range for the refractive index distribution coefficients $h_4$, $h_6$, and $h_8$ determined by Equations 32 to 56 generally shows the following ranges:

for $r_0=0.05$ mm, the MTF value of a 72 line-pairs/mm pattern is greater than 50%;

for $r_0=0.30$ mm, the MTF value of a 12 line-pairs/mm pattern is greater than 50%; and for $r_0=0.60$ mm, the MTF value of a 6 line-pairs/mm pattern is greater than 50%.

Figure 21A:
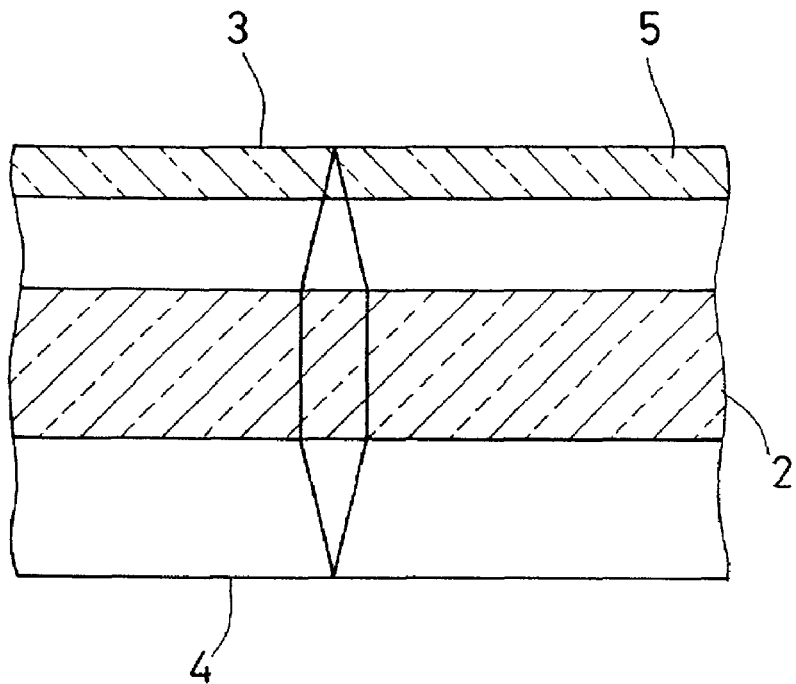
FIGS. 21A and 21B are a cross-sectional view showing an optical imaging system provided with a parallel plane transparent substrate according to an embodiment of the present invention.
Figure 21B:
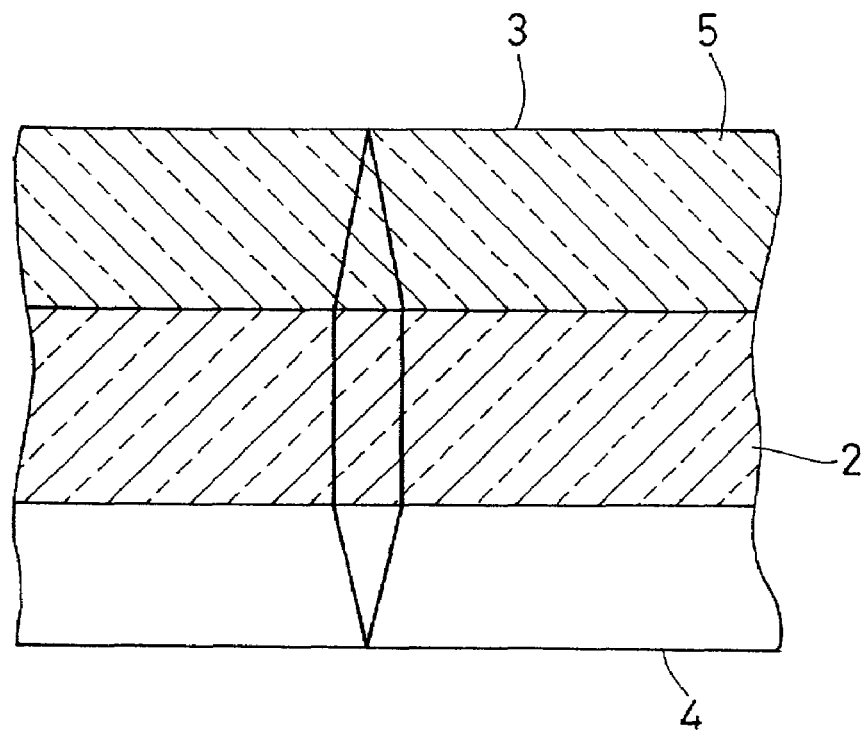
Figure 22:
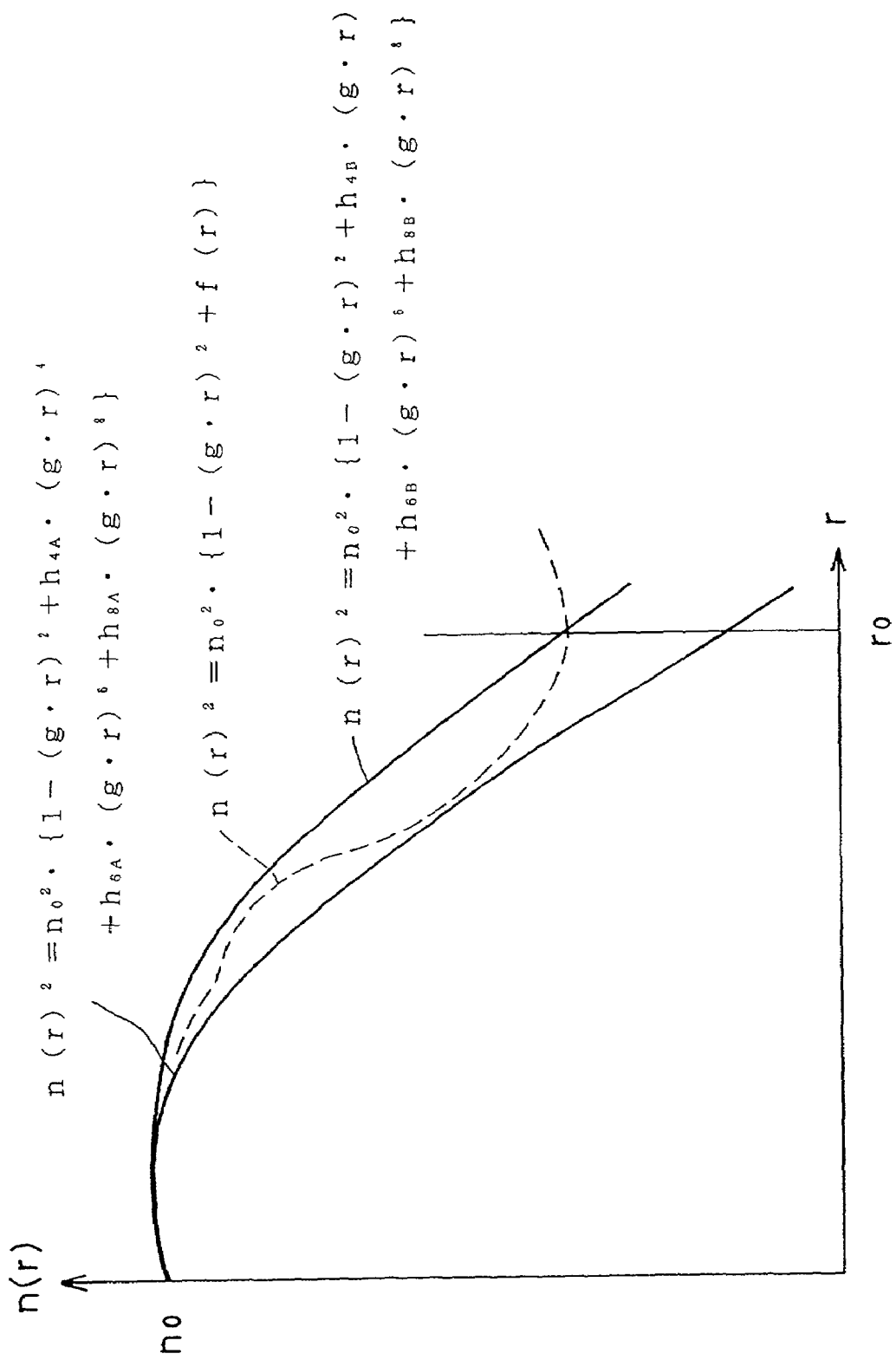
FIG. 22 shows another way of determining the good image range for the refractive index distribution coefficients $h_4$, $h_6$, and $h_8$ of the rod lenses used in an optical imaging system according to an embodiment of the present invention.

In this embodiment, it is desirable that a parallel plane transparent substrate (cover glass) is arranged so that the manuscript plane 3 is located at the front focal position of the rod lens array 2, as shown in FIG. 21A. This desired configuration allows the manuscript plane 3 to be set at the front focal position by only pressing a manuscript to the surface of the transparent substrate 5. Moreover, it is desirable that the parallel plane transparent substrate (cover glass) 5 is in contact with the lens surface of the rod lens array 2, as shown in FIG. 21B. This can be achieved easily by adjusting the thickness of the transparent substrate (cover glass) 5. This desired configuration can simplify the adjustment of the distance between the rod lens array 2 and the front focal position during fabrication of the optical imaging system, thereby reducing the cost.

In this embodiment, the good image range is determined by Equation 18. However, an even better image range can be achieved by determining the range with $$k_A^2 + k_B^2 + k_C^2 \leq 0.7.$$  Eq. 42

In this embodiment, the refractive index distribution of the rod lenses 1 is expressed by Equation 13. However, it is not limited to such a distribution. For example, assuming that the secondary refractive index distribution coefficient g, which represents the refractive power near the optical axis, remains the same, the refractive index distribution of the rod lenses 1 can be expressed generally by $$n(r)^2 = n_0^2 \cdot \{1-(g \cdot r)^2 + f(r)\} \quad \text{Eq. 43}$$

where f(r) is a function of r.

Even if a refractive index distribution is given by the general equation (i.e., Equation 43), a "good image range" for this refractive index distribution can be achieved as long as f(r) satisfies the relationship given by $$h_{4A} \cdot (g \cdot r)^4 + h_{6A} \cdot (g \cdot r)^6 + h_{8A} \cdot (g \cdot r)^8 \leq f(r) \leq h_{4B} \cdot (g \cdot r)^4 + h_{6B} \cdot (g \cdot r)^6 + h_{8B} \cdot (g \cdot r)^8 \quad \text{Eq. 44}$$

for r in the range of $0 \leq r \leq r_0$ with respect to two groups of refractive index distribution coefficients ($n_0$, g, $h_{4A}$, $h_{6A}$, $h_{8A}$) and ($n_0$, g, $h_{4B}$, $h_{6B}$, $h_{8B}$) that are in the ranges determined by Equations 17 and 18.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical imaging system comprising:
   a rod lens array comprising a plurality of rod lenses having a refractive index distribution in a radial direction that are arranged in two rows with their optical axes in parallel, and
   a manuscript plane and an image plane that are located on opposite sides of the rod lens array,
   wherein the refractive index distribution of the rod lenses is expressed by $$n(r)^2 = n_0^2 \cdot \{1-(g \cdot r)^2 + h_4 \cdot (g \cdot r)^4 + h_6 \cdot (g \cdot r)^6 + h_8 \cdot (g \cdot r)^8\} \quad \text{Eq. 1}$$

where r is a radial distance from an optical axis of the rod lenses, $n_0$ is a refractive index on the optical axis of the rod lenses, and g, $h_4$, $h_6$ and $h_8$ are refractive index distribution coefficients,
when $h_4$ is an x coordinate, $h_6$ is a y coordinate, and $h_8$ is a z coordinate in a three-dimensional Cartesian coordinate system, a locus of the refractive index distribution coefficients $h_4$, $h_6$ and $h_8$ is a spheroid, and
the spheroid is defined by a vector X* that is expressed by $$X^* = (x, y, z) = O^* + k_A A^* + k_B B^* + k_C C^* \quad \text{Eq. 2}$$

where O* is a vector from an origin of the Cartesian coordinate system to a center of the spheroid, A*, B* and C* are vectors in the directions of a major axis, a mean axis and a minor axis of the spheroid, respectively, and $k_A$, $k_B$ and $k_C$ satisfy $k_A^2 + k_B^2 + k_C^2 \leq 1$.

2. The optical imaging system according to claim 1, wherein $k_A$, $k_B$ and $k_C$ satisfy $$k_A^2 + k_B^2 + k_C^2 \leq 0.7. \quad \text{Eq.3}$$

3. The optical imaging system according to claim 1, wherein the refractive index $n_0$ on the optical axis of the rod lenses is in a range of $1.4 \leq n_0 \leq 1.8$.

4. The optical imaging system according to claim 1, wherein a product $g \cdot r_0$ of the refractive index distribution coefficient g and a radius $r_0$ of a portion of each rod lens functioning as a lens is in a range of $0.04 \leq g \cdot r_0 \leq 0.27$.

5. The optical imaging system according to claim 1, wherein the refractive index distribution of the rod lenses is expressed by $$n(r)^2 = n_0^2 \cdot \{1-(g \cdot r)^2 + f(r)\} \quad \text{Eq.4}$$

where f(r) is a function of r, and the f(r) satisfies $$h_{4A} \cdot (g \cdot r)^4 + h_{6A} \cdot (g \cdot r)^6 + h_{8A} \cdot (g \cdot r)^8 \leq f(r) \leq h_{4B} \cdot (g \cdot r)^4 + h_{6B} \cdot (g \cdot r)^6 + h_{8B} \cdot (g \cdot r)^8 \quad \text{Eq.5}$$

for r in a range of $0 \leq r \leq r_0$ ($r_0$: a radius of a portion of each rod lens functioning as a lens) with respect to two groups of refractive index distribution coefficients ($n_0$, g, $h_{4A}$, $h_{6A}$, $h_{8A}$) and ($n_0$, g, $h_{4B}$, $h_{6B}$, $h_{8B}$) that are in the ranges determined by Equation 2.

6. The optical imaging system according to claim 1, wherein a radius $r_0$ of a portion of each rod lens functioning as a lens is in a range of $0.05 \text{ mm} \leq r_0 \leq 0.60 \text{ mm}$.

7. The optical imaging system according to claim 1, wherein $r_0/R$ is in a range of $0.5 \leq r_0/R \leq 1.0$, where $r_0$ is a radius of a portion of each rod lens functioning as a lens and 2R is a distance between the optical axes of two neighboring rod lenses.

8. The optical imaging system according to claim 1, wherein $Z_0/P$ is in a range of $0.5 \leq Z_0/P \leq 1.0$, where $Z_0$ is a length of the rod lenses and $P = 2/g$ is a one-pitch length of the rod lenses.

9. The optical imaging system according to claim 1, wherein an overlapping degree m is in a range of $0.9 \leq m \leq 5.0$, and the overlapping degree m is given by $m = X_0/2r_0$, where $r_0$ is a radius of a portion of each rod lens functioning as a lens and $X_0$ is an image radius that the rod lens projects onto the image plane.

10. The optical imaging system according to claim 1, wherein a parallel plane transparent substrate is arranged so that the manuscript plane is located at a front focal position of the rod lens array.

11. The optical imaging system according to claim 10, wherein the parallel plane transparent substrate is in contact with a lens surface of the rod lens array.

* * * * *